(12) United States Patent
Roh et al.

(10) Patent No.: US 11,490,162 B2
(45) Date of Patent: Nov. 1, 2022

(54) METHOD AND SYSTEM FOR PROVIDING CONTENTS

(71) Applicant: NAVER WEBTOON LTD., Seongnam-si (KR)

(72) Inventors: Ji Hoon Roh, Seongnam-si (KR); Jeong Eun Yoon, Seongnam-si (KR); Ellie Jieun Park, Seongnam-si (KR); Jin Su Jang, Seongnam-si (KR); Seon Yeong Hwang, Seongnam-si (KR); Yong Soo Lee, Seongnam-si (KR); Chang Min Jeon, Seongnam-si (KR); Jun Kyu Park, Seongnam-si (KR)

(73) Assignee: NAVER WEBTOON LTD., Seongnam-si (KR)

( * ) Notice: Subject to any disclaimer, the term of this patent is extended or adjusted under 35 U.S.C. 154(b) by 0 days.

(21) Appl. No.: 17/390,427

(22) Filed: Jul. 30, 2021

(65) Prior Publication Data
US 2022/0038784 A1    Feb. 3, 2022

(30) Foreign Application Priority Data

Jul. 31, 2020 (KR) .......................... 10-2020-0095628

(51) Int. Cl.
*H04N 21/472* (2011.01)
*H04N 21/45* (2011.01)
*H04N 21/482* (2011.01)

(52) U.S. Cl.
CPC ... *H04N 21/47202* (2013.01); *H04N 21/4532* (2013.01); *H04N 21/47211* (2013.01); *H04N 21/4821* (2013.01)

(58) Field of Classification Search
None
See application file for complete search history.

(56) References Cited

U.S. PATENT DOCUMENTS

| | | | |
|---|---|---|---|
| 2013/0332463 A1* | 12/2013 | Roberts | G06F 16/4393 707/741 |
| 2015/0082182 A1* | 3/2015 | Lim | G06F 16/9027 715/738 |
| 2021/0042830 A1* | 2/2021 | Burke | G06Q 30/0631 |

FOREIGN PATENT DOCUMENTS

| | | |
|---|---|---|
| JP | 2010028437 A | 2/2010 |
| JP | 2015504613 A | 6/2015 |
| JP | 2016103836 A | 12/2016 |
| JP | 2015152950 A | 2/2017 |
| KR | 1020160069282 A | 6/2016 |
| KR | 101993802 B1 | 6/2019 |
| KR | 1020200028132 A | 3/2020 |
| WO | 2010119678 A1 | 10/2010 |

OTHER PUBLICATIONS

Office action issued in Japanese application No. 2020-161467, dated Nov. 30, 2021.
(Continued)

*Primary Examiner* — Jefferey F Harold
*Assistant Examiner* — Charles N Hicks
(74) *Attorney, Agent, or Firm* — Greer Burns & Crain Ltd.

(57) ABSTRACT

A method for providing contents includes receiving a selection request for specific contents, from an electronic device; and providing, to the electronic device, an episode list of a plurality of episodes which constitute the specific contents, based on the selection request for the specific contents.

17 Claims, 21 Drawing Sheets

(56) References Cited

OTHER PUBLICATIONS

Office Action issued in KR application No. 10-2020-0095628 dated Aug. 22, 2022.
[Review] Kakao Page is not famous (Kakafe) 2 Naver series recommendations 1 piece If you wait, free works are included; Jan. 31, 2020.
Free Webtoon based om 'Saetbyul'; Jun. 28, 2020.
"I downloaded the next webtoon app. It's worth binge-watching from the first episode", Apr. 21, 2019.

* cited by examiner

| BUNDLE SALE - OPTION 1 | | |
|---|---|---|
| USED OR NOT | Y | |
| BUNDLE UNIT (EPISODE NUMBER) | 50 | 100 ARE AVAILABLE TO THE MAXIMUM |
| MINIMUM EPISODE NUMBER | 20 | |
| DISCOUNT PRICE OF SINGLE EPISODE | 3 | |
| DISCOUNT RATE (%) | 25% | |
| FINAL SALE PRICE (Coin) | 60~150 | |
| BUNDLE SALE - OPTION 2 | | |
| USED OR NOT | N | |
| BUNDLE UNIT (EPISODE NUMBER) | | 100 ARE AVAILABLE TO THE MAXIMUM |
| MINIMUM EPISODE NUMBER | | |
| DISCOUNT PRICE OF SINGLE EPISODE | | |
| DISCOUNT RATE (%) | - | |
| FINAL SALE PRICE (COIN) | - | |

METHOD AND SYSTEM FOR PROVIDING CONTENTS

CROSS-REFERENCE TO RELATED APPLICATION

Pursuant to 35 U.S.C. § 119(a), this application claims the benefit of the earlier filing date and the right of priority to Korean Patent Application No. 10-2020-0095628, filed on Jul. 31, 2020, the contents of which are incorporated by reference herein in their entirety.

BACKGROUND OF THE INVENTION

Field of Invention

The present disclosure relates to a method and a system for providing contents.

Description of the Related Art

As technologies develop, utilization of digital devices is actively ongoing. Especially, electronic devices (e.g., a smart phone, a tablet PC, etc.) are provided with various functions such as web surfing using the Internet, music appreciation, and viewing of video contents, as well as a communication function such as a calling or a transmission/reception of text messages.

Owing to the popularization of such electronic devices, consumption of contents is rapidly increased. As a representative example of such contents, there is a WEBTOON.

The webtoon is a cartoon uploaded and spread through an Internet communication network, and is a compound word of a web and a cartoon.

As the consumption of such webtoon is steadily increased, various providers (or webtoon-related service providers) are developing various services such that users use services of the providers more conveniently.

For instance, Korean Laid-Open Patent No. 10-2016-0069282 (a system and method for enhancing a service speed of a webtoon) discloses a method for enhancing a webtoon providing speed by minimizing download delay by caching webtoon contents of the next episode to a user's mobile terminal.

In order to enhance user's convenience in webtoon services, various research is actively ongoing. As another method for enhancing user's convenience, webtoon service environments may be improved such that a user uses webtoon contents more intuitively.

BRIEF SUMMARY OF THE INVENTION

Therefore, an aspect of the present disclosure is to provide a method and a system for providing contents, capable of providing information on contents intuitively.

Another aspect of the present disclosure is to provide a method and a system for providing contents, capable of allowing a user to check an attribute of contents more easily.

Another aspect of the present disclosure is to provide a method and a system for providing contents, capable of allowing a user to recognize more intuitively contents which have been uploaded, and contents which are being uploaded.

Another aspect of the present disclosure is to provide a method and a system for providing contents, capable of allowing a user to check more easily information on available contents, by providing information on a use right of the user more intuitively.

In order to achieve these and other advantages and in accordance with the purpose of this specification, as embodied and broadly described herein, there is provided a method for providing contents, comprising: receiving a selection request for specific contents, from an electronic device; and providing, to the electronic device, an episode list of a plurality of episodes which constitute the specific contents, based on the selection request for specific contents.

Here, the episode list provided to the electronic device may be aligned in a different manner on the electronic device, according to the contents type of the specific contents.

The contents type of the specific contents may be one of a first contents type and a second contents type, according to whether the specific contents have been completely uploaded or not.

In order to achieve these and other advantages and in accordance with the purpose of this specification, as embodied and broadly described herein, there is also provided a system for providing contents, comprising: a communication unit configured to receive a selection request for specific contents, from an electronic device; a storage unit configured to store a plurality of episodes included in the specific contents; and a controller configured to control the communication unit such that a plurality of items corresponding to the plurality of episodes, respectively, are provided to the electronic device, in response to the selection request.

Further, the present disclosure may be embodied by a program storable in a non-transitory computer-readable recording medium, the program being executed by at least one processor on an electronic device. The program may include command code which perform: a process of receiving a selection request for specific contents, from the electronic device; and a process of providing, to the electronic device, an episode list of a plurality of episodes which constitute the specific contents, based on the selection request for the specific contents.

As aforementioned, in the method and the system for providing contents according to the present disclosure, an alignment method of contents may be differently configured according to an attribute of the contents. This may allow a user to intuitively check an attribute of corresponding contents only based on an alignment method of the contents.

More specifically, in the method and the system for providing contents according to the present disclosure, an alignment method of an episode list of episodes which constitute contents may be differently provided according to contents which have been completely uploaded and contents which are being uploaded. Thus, a user may intuitively check an uploaded state of corresponding contents, only based on an alignment method of an episode list.

In the present disclosure, in the case of contents which have been completely uploaded, an episode list is aligned in a time order. This may induce a user to sequentially use episodes from a first episode. Further, in the present disclosure, in the case of contents which are being uploaded, an episode list is aligned in a reverse time order. This may enhance user's convenience in immediately using contents which have been updated most recently.

Further, in the present disclosure, information on a use right with respect to a corresponding episode may be provided to each episode item included in the episode list. Thus, a user may intuitively check whether a corresponding episode is available or not, through information on each episode item.

BRIEF DESCRIPTION OF THE DRAWINGS

FIGS. 6A, 6B, 7A, 7B, 8A, 8B, 9A, 9B, 10 and 11 are conceptual diagrams for explaining a method for inducing a user's economic consumption at the time of purchasing charged contents, in a method and a system for providing contents according to the present disclosure.

DETAILED DESCRIPTION OF THE INVENTION

Figure 1:
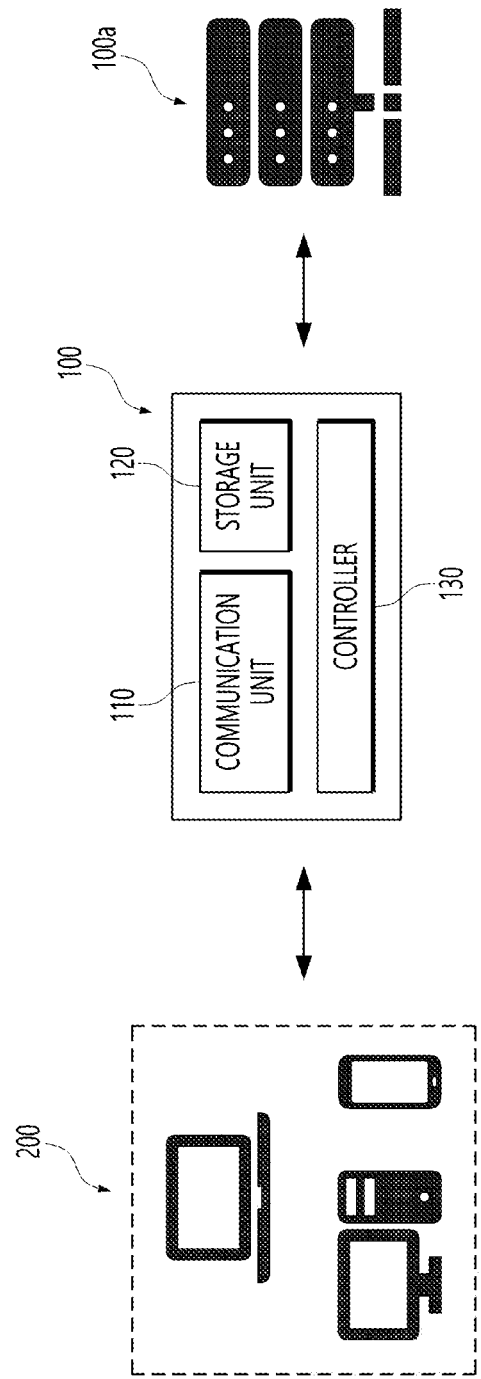
FIG. 1 is a block diagram for explaining a method and a system for providing contents according to the present disclosure.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of features, numbers, steps, functions, several components, or combinations thereof, disclosed in the specification, and it is also understood that greater or fewer features, numbers, steps, functions, several components, or combinations thereof may likewise be utilized.

The present disclosure relates to a method and a system for providing contents, and may provide a method for allowing a user to check an attribute of contents more easily, by intuitively providing contents information.

The system for providing contents explained in the present disclosure may be configured as a system for providing at least one contents among various types of contents.

The type of contents to which the present disclosure can be applied may be variable. For instance, at least one of contents such as a webtoon, music, an e-book, moving images and still images may be provided in the present disclosure.

Hereinafter, for convenience, the contents corresponding to a webtoon will be explained. Here, the webtoon, a compound word of a web and a cartoon, means a cartoon or a comic strip provided through an Internet communication network.

Such contents corresponding to a webtoon (hereinafter, will be referred to as 'webtoon contents') may be provided to an electronic device through a method and a system for providing contents according to the present disclosure. Thus, a user may use webtoon contents provided through a method and a system for providing contents according to the present disclosure, through an electronic device.

Here, the electronic device means an electronic device used by a user, and is not limited to a specific type if it can output webtoon contents provided through the system for providing contents according to the present disclosure.

The webtoon contents provided through the method and the system for providing contents according to the present disclosure may be provided through a web page accessible through an electronic device.

In this case, contents output to the web page, and a control thereof may be performed by a contents providing system which communicates with an electronic device.

Contents provided through the method and the system for providing contents according to the present disclosure may be provided through an application installed on an electronic device.

In this case, the contents may be provided through an execution screen of the application installed on the electronic device. Here, the application may be an exclusive application for providing "webtoon contents".

In this case, the system for providing contents according to the present disclosure may be embodied in the form of an application. That is, components of the system for providing contents to be explained hereinafter, and functions executed by the components may be components of an application, and functions executed by the components of the application.

Further, an application for providing webtoon contents may not be necessarily limited to an exclusive application for providing "webtoon contents". In this case, the application may provide other additional functions (e.g., a messenger function, a web surfing function, etc.) as well as a function to provide webtoon contents.

Further, the application performs at least a part of functions executed by the contents providing system to be explained hereinafter, and another part thereof may be performed by an additional contents providing system which communicates with the application.

Hereinafter, a subject which provides the contents providing method according to the present disclosure will be explained. As aforementioned, the contents providing method to be explained hereinafter may be implemented on a display screen of an electronic device by an application installed on the electronic device, or may be implemented on a web page.

The webtoon contents of the present disclosure may consist of a plurality of subcontents. Such plurality of subcontents may constitute series of the webtoon contents.

Here, the series may mean consecutive planned contents.

In the present disclosure, the "subcontents" will be referred to as "episodes", in order to prevent confusion of terms of the webtoon contents and the subcontents.

Figure 2:
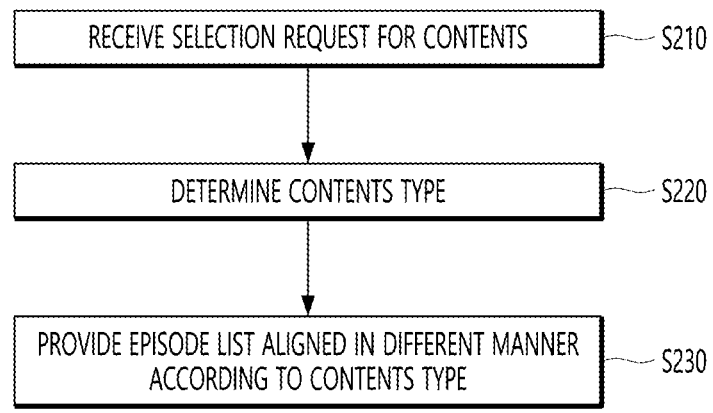
FIG. 2 is a flowchart for explaining a method for providing contents according to the present disclosure.
Figure 3A:
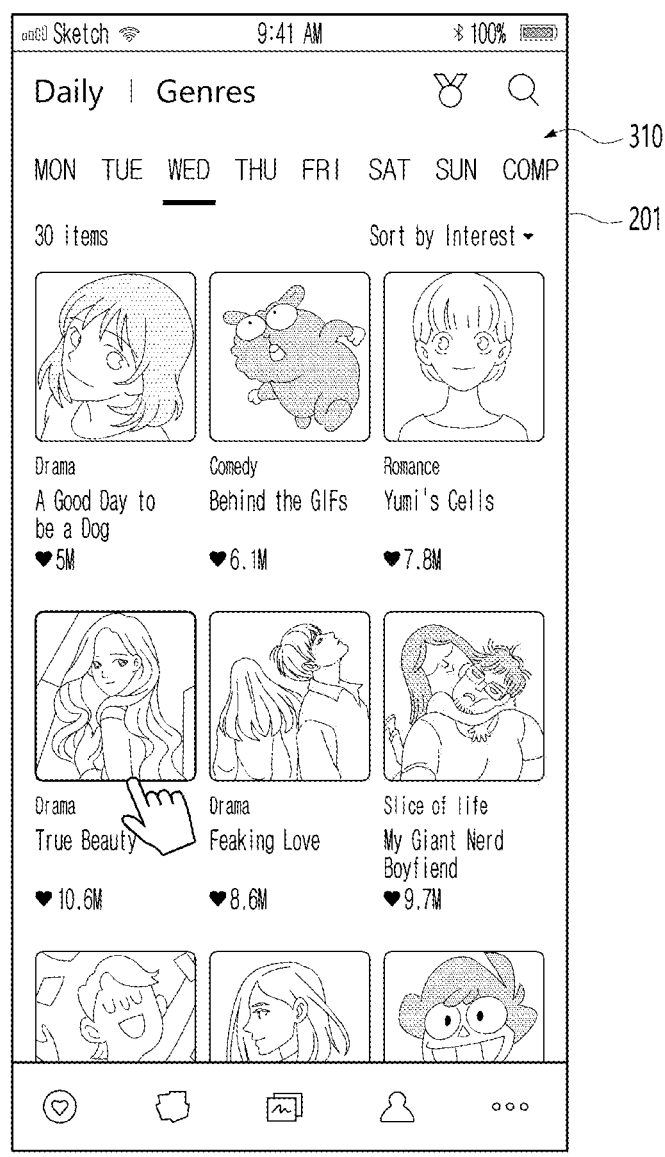
FIGS. 3A to 3C are conceptual diagrams for explaining a method for providing an episode list according to a type of contents, in a method and a system for providing contents according to the present disclosure.
Figure 3B:
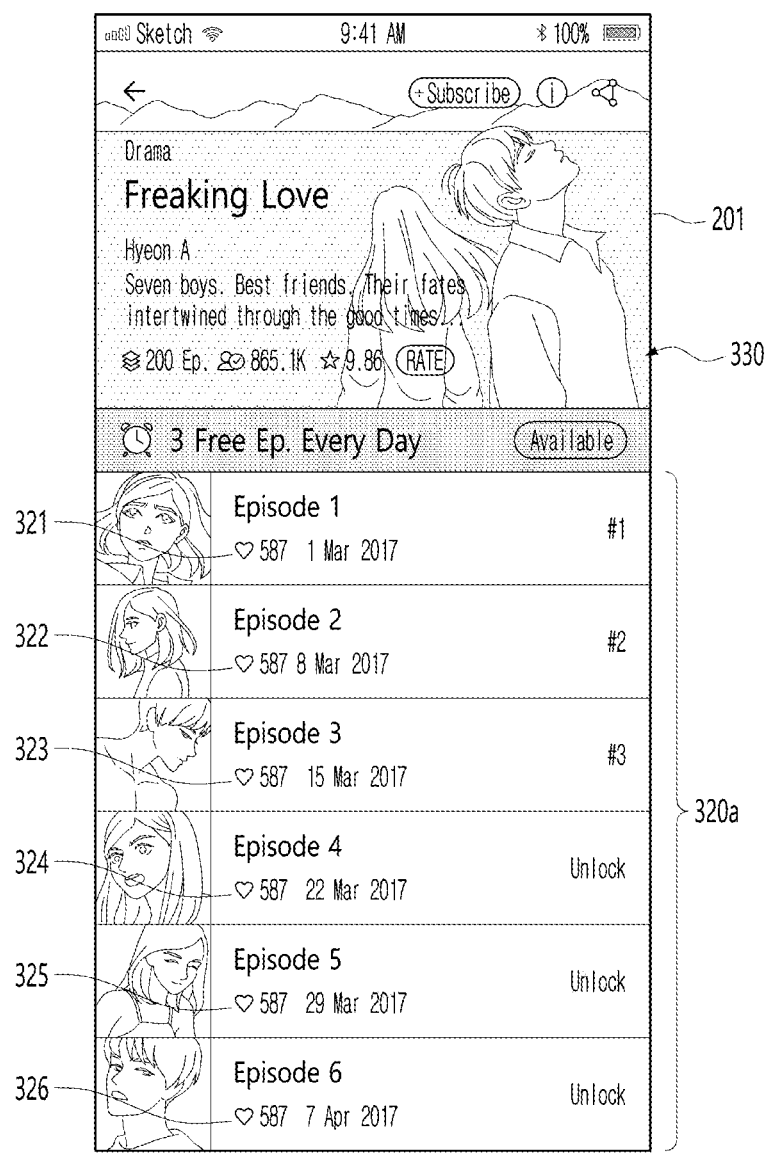
Figure 3C:
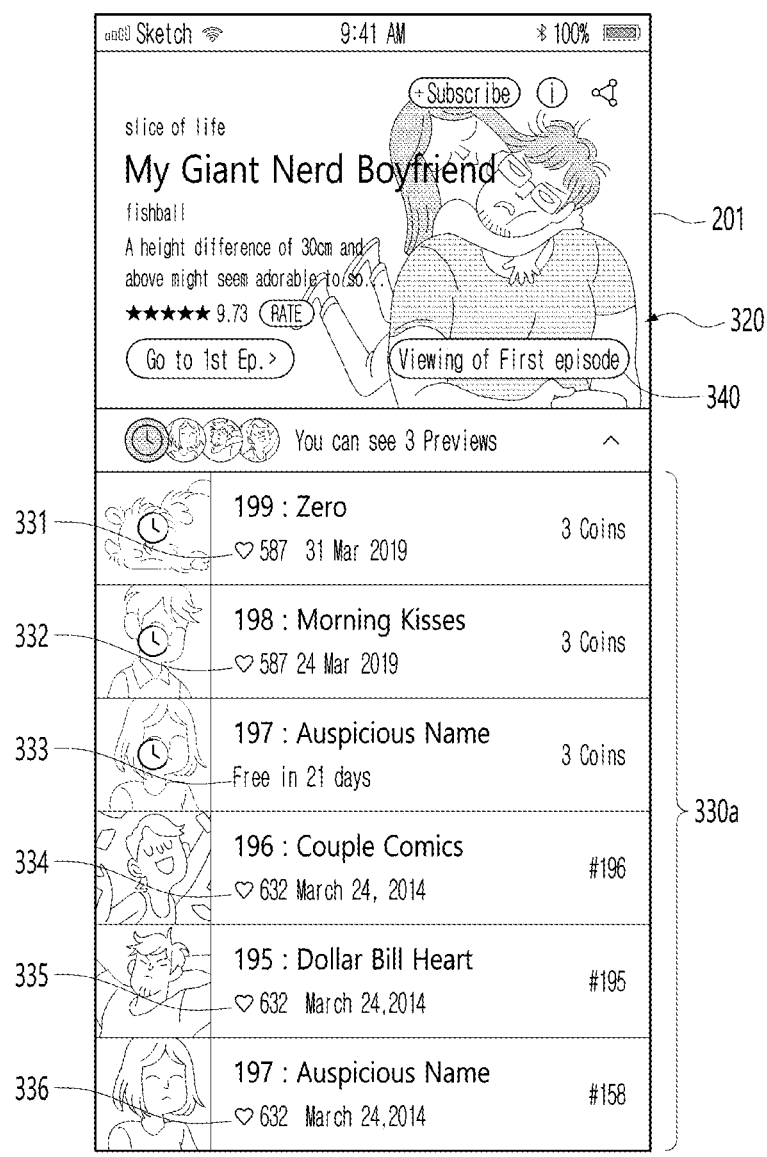

Hereinafter, a method and a system for providing contents, which provide the aforementioned webtoon contents which consist of a plurality of episodes will be explained in more detail with reference to the attached drawings. FIG. 1 is a block diagram for explaining a method and a system for providing contents according to the present disclosure. FIG. 2 is a flowchart for explaining a method for providing contents according to the present disclosure. FIGS. 3A to 3C are conceptual diagrams for explaining a method for providing an episode list according to a type of contents, in a method and a system for providing contents according to the present disclosure.

As shown in FIG. 1, a contents providing system 100 for providing contents may include a communication unit 110, a storage unit 120 and a controller 130.

Here, the communication unit 110 may provide (transmit) webtoon contents to an electronic device 200, via a wired or wireless communication.

As shown in FIG. 1, the electronic device 200 is not limited to a specific type, and may be implemented as a mobile terminal, a smart phone, a notebook computer, a laptop computer, a slate PC, a tablet PC, an ultra book, a desktop computer, a digital broadcast terminal, a personal digital assistant (PDA), a portable multimedia player (PMP), a navigator, a wearable device (for example, a smart watch, smart glasses, a head mounted display (HMD)), and the like.

The storage unit 120 may be configured to store various information related to provision of webtoon contents. The storage unit 120 may include at least one contents server 100a (or a contents database (DB)) including a plurality of webtoon contents.

Hereinafter, both of the contents server and the contents DB will be referred to as 'contents server' 100a. That is, it is obvious that the contents server explained in the present disclosure may be understood as the contents DB.

Further, the contents server 100a for storing a plurality of webtoon contents may be implemented as a separate configuration from the storage unit 120. In this case, the contents providing system 100 may provide webtoon contents retained at the contents server 100a to the electronic device 200, by controlling the contents server 100a.

Further, the storage unit 120 may store information on a user who has subscribed to a service provided in the contents providing system 100 of the present disclosure (e.g., a webtoon contents providing system). Such user information may include information on a user account (e.g., identification (ID)). A user may use webtoon contents by logging in a service provided in the contents providing system 100 of the present disclosure with a user account.

The controller 130 may perform a series of controls for providing webtoon contents to the electronic device. The controller 130 may be implemented using any type of device capable of processing data, such as a processor. A processor may refer to a hardware built-in data processing device having a circuit physically structured to perform functions expressed in code or instructions included in computer programs. Examples of the hardware built-in data processing device may include devices such as a microprocessor, a central processing unit (CPU), a processor core, a multiprocessor, an application-specific integrated circuit (ASIC), a field programmable gate array (FPGA), etc.

Hereinafter, a method for providing webtoon contents according to the present disclosure will be explained together with the aforementioned components.

Firstly, in the present disclosure, a selection request to view contents is received (S210, refer to FIG. 2).

As shown in FIG. 3A, the selection request to view contents may be transmitted to the contents providing system 100 from the electronic device 200, based on a selection of specific contents on the display screen 201 of the electronic device 200.

The controller 130 may receive the selection request by the selection of the specific contents (e.g., specific webtoon contents) on the electronic device 200, through the communication unit 110.

In a case in which the system for providing contents 100 according to the present disclosure is an application, the communication unit 110 may serve as an interface to receive a selection signal of the electronic device 200. That is, in a case where specific contents are selected from the electronic device 200 by a user, the communication unit 110 may receive a selection signal corresponding to the user's selection on the electronic device 200.

When the selection request with respect to the specific contents is received from the electronic device 200, the controller 130 may provide an episode list of a plurality of episodes which constitute the specific contents, to the electronic device.

As shown in FIGS. 3B and 3C, episode lists 320a, 330a may include a plurality of episode items (321-326 of FIG. 3B, 331-336 of FIG. 3C).

Here, the plurality of episode items (321-326 of FIG. 3B, 331-336 of FIG. 3C) are configured to correspond to a plurality of episodes which constitute the specific contents, respectively.

When a selection request with respect to the specific contents is received as shown in FIG. 3A, the controller 130 may provide the episode lists (320a of FIG. 3B, 330b of FIG. 3C) including a plurality of episode items corresponding to a plurality of episodes included in the specific contents, to the electronic device 200, based on the selection request, as shown in FIGS. 3B and 3C.

The episode list of the specific contents, provided to the electronic device 200, may be aligned on the electronic device in a different manner, according to a type of the specific contents.

More specifically, in the present disclosure, when specific contents are selected by a user, a type of the selected specific contents may be determined (S220).

In the present disclosure, an episode list aligned in a different manner according to the type of the specific contents may be provided to the electronic device 200 (S230).

More specifically, when specific contents are selected by a user, the controller 130 may determine a type of the selected specific contents.

Here, the contents type may be determined as one of a first contents type and a second contents type, according to whether contents have been completely serialized (uploaded) or not.

For instance, when contents have been completely serialized, the contents may be defined as a first contents type.

On the contrary, when contents are being serialized, the contents may be defined as a second contents type.

Here, the "contents have been completely serialized" may mean that episodes which constitute the contents have been completely uploaded.

For instance, in the case of contents which are composed of 32 episodes, if all episodes have been completely uploaded up to the 32th episode, it may be expressed that the "corresponding contents have been completely serialized".

In contrast, the "contents are being serialized" may mean that episodes which constitute the contents are being uploaded.

For instance, in the case of contents which are composed of 32 episodes, if episodes have been completely uploaded up to the 30th episode, it may be expressed that the "corresponding contents are being serialized".

Here, the "serialized" may mean that episodes which constitute contents are uploaded to the contents server 100a, etc., in a state which can be provided to a user.

Episodes may be serialized or uploaded in the contents server 100a, in a state which can be provided to a user, at a preset time period (e.g., one week). Alternatively, episodes may be serialized or uploaded in the contents server 100a, in a state which can be provided to a user, at an arbitrary time.

In the present disclosure, the controller 130 may control an alignment type of a list of episodes which constitute specific contents, according to a type of the specific contents selected by a user. This is in order to enhance user's convenience.

In a case where contents which are being uploaded have been completely uploaded, a type of the contents may be converted. For instance, in a case in which specific contents are being uploaded, the specific contents may have a second contents type. Further, in a case where the specific contents have been completely uploaded, the second contents type of the specific contents may be converted into a first contents type.

When specific contents selected by a user are a first contents type which means a completely uploaded state of episodes, the controller 130 may align an episode list with respect to the specific contents in a time order. That is, an episode list of the specific contents may be aligned in a time order.

Here, the time order may be counted (obtained) based on an uploaded time (or a publicized time) of episodes which constitute contents, in a state which can be used by a user. More specifically, the time order may be counted based on an uploaded time of an episode which has been firstly uploaded, among episodes which constitute contents.

As shown in FIG. 3B, if specific contents 330 (e.g., webtoon contents having a title of "Freaking Love") are a first contents type, which means a completely uploaded state of contents, an episode list 320a with respect to the specific contents 330 may be aligned in a time order.

For instance, under an assumption that a time order is counted based on an uploaded time of an episode, a plurality of episode items 321-326 which constitute the episode list 320a may be sequentially aligned based on uploaded times of episodes corresponding to the episode items, respectively.

Thus, on an uppermost position (first item) of the episode list 320a, may be arranged an episode item 321 corresponding to an episode which has been firstly uploaded among a plurality of episodes which constitute specific contents, may be arranged.

Based on a selection request for specific contents having a first contents type from the electronic device 200, the controller 130 may provide an episode list of the specific contents, aligned in a time order, to the electronic device.

Although not shown, the controller 130 may align an episode list based on history information of a user account (or a specific user account) logged in through the electronic device 200. More specifically, the controller 130 may determine whether there exists a specific episode which has been previously viewed by a specific user account which has been logged in through the electronic device 200, among a plurality of episodes which constitute specific contents selected by a user.

If there exists a specific episode viewed by a user, the controller 130 may arrange a specific episode item corresponding to the specific episode, on an uppermost position (or the first item) of an episode list.

This is in order to inform the user of the existence of an episode which has been previously viewed by the user, and in order to immediately access a subsequent episode to the viewed episode.

Here, notification information (or a graphic object) indicating the user's previous view history may be displayed on an item corresponding to the episode which has been previously viewed by the user.

In a case in which a plurality of episodes of specific contents have been viewed by a specific user account, the controller 130 may align an episode list based on one episode which satisfies a preset condition.

Here, the preset condition may be time when a user has viewed the episodes. In a case in which a plurality of episodes of specific contents have been viewed by a specific user account, the controller 130 may align an episode list based on an episode which has been viewed most recently, among the plurality of episodes.

In this case, a specific episode item corresponding to the specific episode which has been viewed most recently by a specific user account, may be arranged on the uppermost end of the episode list. Episode items corresponding to episodes uploaded after the specific episode may be arranged after the specific episode item. That is, the controller 130 may align an episode list in a time order, based on an episode which has been previously viewed by a user.

On the contrary, the controller 130 may arrange a specific episode item corresponding to a specific episode which has been viewed most recently by a specific user account, on the uppermost end of the episode list. Then, the controller 130 may arrange episode items based on a firstly-loaded episode among a plurality of episodes which constitute specific contents, after the specific episode item. In this case, a specific episode item corresponding to a specific episode which has been viewed most recently by a specific user account, may be arranged on the first item (the uppermost end) of the episode list, and an episode item corresponding to a firstly-loaded episode among a plurality of episodes which constitute specific contents, may be arranged after the second item.

In the present disclosure, an episode item corresponding to an episode which has been previously viewed by a user is firstly arranged. This is in order to allow the user to immediately access an episode subsequent to the already-viewed episode.

In the above example, an episode which has been previously viewed by a user is arranged on the uppermost end of the episode list. However, this may be modified in various manners. For instance, the controller 130 may arrange an episode item corresponding to a first episode among episodes loaded after a specific episode which has been previously viewed by a user is loaded, on the uppermost end of the episode list.

Next, a case in which specific contents have a second contents type, which means that episodes are being uploaded, will be explained.

In a case where specific contents selected by a user have a second contents type which means that episodes are being uploaded, the controller 130 may align an episode list with respect to the specific contents in a reverse time order. That is, the episode list with respect to the specific contents may be aligned in a reverse time order.

Here, the reverse time order may be counted based on uploaded time (or a publicized time) of an episode which has been uploaded most recently, among a plurality of episodes which constitute specific contents.

As shown in FIG. 3C, if specific contents 320 (e.g., webtoon contents having a title of "My Giant Nerd Boyfriend") have a second contents type which means that contents are being uploaded, an episode list 330a with respect to the specific contents 320 may be aligned in a reverse time order.

For instance, the episode list 330a may be sequentially aligned in a reverse time order, based on an episode which has been uploaded most recently among a plurality of episodes which constitute the specific contents.

Thus, on an uppermost position (first item) of the episode list 330a, an episode item 331 corresponding to an episode which has been uploaded most recently among a plurality of episodes which constitute the specific contents, may be arranged.

Based on a selection request for specific contents having a second contents type from the electronic device 200, the controller 130 may provide the episode list 330a of the specific contents, aligned in a reverse time order, to the electronic device.

This is in order to reflect user's needs to firstly access an episode which has been uploaded most recently, since contents are being uploaded in the case of the second contents type.

In the case of the second contents type, the episode item 331 corresponding to an episode which has been uploaded most recently is arranged on the uppermost end of the episode list 330a. Thus, a user who wishes to use episodes from a firstly-loaded episode may experience inconvenience in scrolling the episode list. Thus, the present disclosure may provide a function icon 340 to provide a function to immediately access a firstly-loaded episode, for user's convenience.

For instance, as shown in FIG. 3C, the function icon 340 to access a specific episode among a plurality of episodes which constitute specific contents may be provided on one region on the display screen of the electronic device 200. Here, the specific episode may be a firstly-loaded episode among a plurality of episodes.

When the function icon 340 is selected, the controller 130 may provide, to the electronic device 200, contents corresponding to a specific episode matched with the function icon 340. Here, the specific episode matched with the function icon 340 may be a firstly-loaded episode among a plurality of episodes which constitute specific contents.

Alternatively, a specific episode based on user history information may match the function icon 340. Here, the specific episode based on user history information may be an episode which has been viewed by a user most recently, among a plurality of episodes which constitute the specific contents. Alternatively, the specific episode based on user history information may be an episode subsequent to an episode which has been viewed by a user most recently, among a plurality of episodes which constitute the specific contents.

As aforementioned, in the method and the system for providing contents according to the present disclosure, an alignment method of contents may be differently configured according to an attribute of the contents. This may allow a user to intuitively check an attribute of corresponding contents only based on an alignment method of the contents.

More specifically, in the method and the system for providing contents according to the present disclosure, an alignment method of an episode list of episodes which constitute contents may be differently provided according to contents which have been completely uploaded and contents which are being uploaded. Thus, a user may intuitively check an uploaded state of corresponding contents, only based on an alignment method of an episode list.

Here, in the present disclosure, in the case of contents which have been completely uploaded, an episode list is aligned in a time order. This may induce a user to sequentially use episodes from a first episode. Further, in the present disclosure, in the case of contents which are being uploaded, an episode list is aligned in a reverse time order. This may enhance user's convenience in immediately using contents which have been updated most recently.

Figure 4:
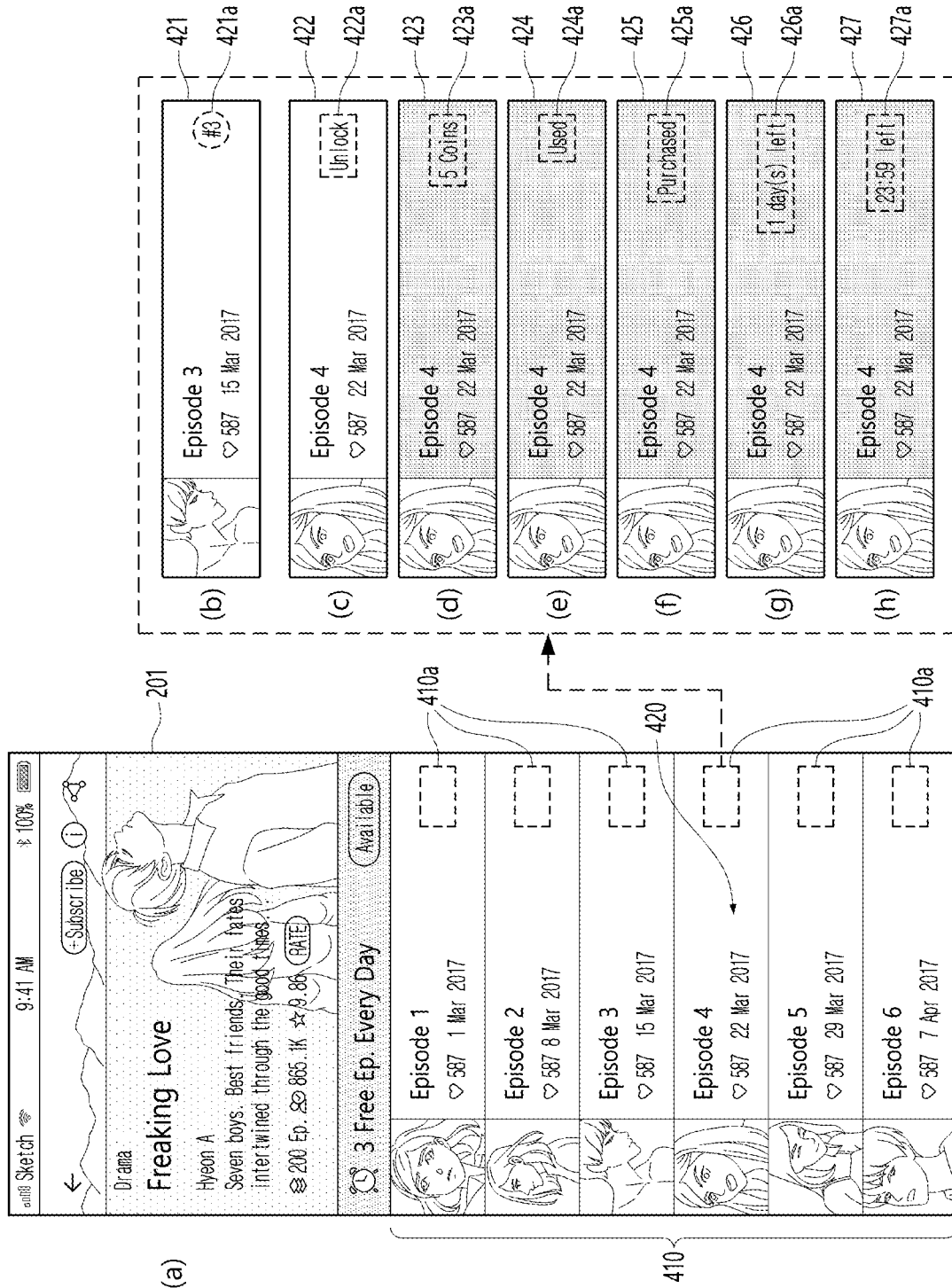
FIG. 4 is a conceptual diagram for explaining a method for specifying each episode on an episode list, in a method and a system for providing contents according to the present disclosure.

Hereinafter, a method for intuitively providing state information of episodes to an episode list will be explained in more detail with reference to the attached drawings. FIG. 4 is a diagram for explaining a method for providing state information of each episode on an episode list.

Here, the state information of an episode may include at least one of i) information on a product type of an episode (a charged product type or a free product type), ii) information on a charged or paid episode use term, in the case of an episode using a use right (or a charged episode viewing right), iii) information on a sale price of a charged episode, iv) information on whether a use history of a charged episode viewing right exists or not, v) information indicating a purchased state (purchase history) of a charged episode, and vi) information on a use term.

Here, the state information of an episode may be determined based on at least one of information on whether a user account which has been logged in through the electronic device 200 has a use right with respect to a corresponding episode, information on a product type of a corresponding episode, and user history information of a corresponding episode.

Here, the use right means a right to use a specific episode by a user account which has been logged in through the electronic device 200. The use right may be determined according to an episode product type and according to whether a user account has a use right or not.

Here, the episode product type may be one of a free product type and a charged product type. 'An episode of a free product type' (or a free episode) may mean an episode immediately viewed (or used) by a user without payment of electronic money, coupons or a viewing right (or a use right). In this case, a user account may have a use right with respect to the free episode.

In contrast, 'an episode of a charged product type' (or a charged episode) may mean an episode viewed (or used) by a user after payment of electronic money, a coupon or a viewing right (or a charged episode viewing right, or a use right). In this case, a user account may have a use right only when it has electronic money or a viewing right.

The controller 130 may output state information (or a graphic object) indicating whether an episode is available or not, to one region of an episode item displayed on the display screen 201 of the electronic device 200, according to an episode product type and a use right of a user account.

A method to output the state information will be explained in more detail. As shown in FIG. 4, the controller 130 may output episode state information to each region 410*a* of episode items which constitute an episode list 410. A specific episode item 420 will be explained as an example.

Firstly, as shown in FIG. 4(*b*), the controller 130 may include first information 421*a* ("#") indicating that a corresponding episode is free, in an item 421 corresponding to an episode of a free product type. The controller 130 may as include the first information 421*a* ("#") in an item corresponding to a free episode. In the case of an episode having a free product type, the controller 130 may not determine whether a user account has a use right with respect to the free episode.

Next, the controller 130 may include second information 422*a* (e.g., "unlock", release of a locked state) different from the first information 421*a* in an item 422 corresponding to an episode of a charged product type, the episode to which a charged episode viewing right is available.

The controller 130 may include a graphic object indicating that a charged episode viewing right allocated to the specific user account is available, in one region of an item displayed on the display screen 201 of the electronic device 200 corresponding to a charged episode.

Here, the charged episode viewing right may be understood as coupons for using (or viewing) a charged episode, without a user purchasing the charged episode by using electronic money. The charged episode viewing right may be retained in a user account. A user can view a charged episode through a charged episode viewing right allocated to his or her user account.

Further, as shown in FIG. 4(*d*), the controller 130 may include third information 423*a* different from the first information 421*a* and the second information 422*a*, in an episode item 423 corresponding to an episode of a charged product type, an episode for which a charged episode viewing right cannot be used. Here, the third information may include information on the amount of money (or electronic money information, e.g., 5 coins) which can purchase a corresponding charged episode.

Further, the controller 130 may output history information to an episode which has been purchased or which has been rented through a charged episode viewing right, by a user account. For instance, as shown in FIG. 4(*e*), "used" 424*a* may be displayed at one region of an episode item 424 corresponding to an episode which has been purchased or which has been rented, as history information. The history information may be modified in various manners. For instance, as shown in FIG. 4(*f*), as the history information, "purchased" may be displayed on an episode item 425 corresponding to an episode which has a purchase history by electronic money. The controller 130 may control contents provision to a user account so that an episode which has been purchased by electronic money can be reviewed anytime without repurchase.

The controller 130 may control the provision of contents to a user account so that an episode purchased by a user account by at least one of the aforementioned methods can be used for free by the user account, even if a contents type of the purchased episode is converted.

For instance, the controller 130 may control contents provision to a user account so that a specific episode purchased by electronic money, a charged episode viewing right, or the like, in a state of a second contents type (under upload) can be used by the user account without an additional purchase, even if a contents type of the specific episode is converted into a first contents type (completion of upload) from the second contents type.

A charged episode viewing right in the present disclosure may be understood as a concept to rent a charged episode. For instance, the controller 130 may control a charged episode viewed through a charged episode viewing right, to be available only for a predetermined time period (or a preset time, e.g., 15 days), to a user account which has used the charged episode viewing right. That is, a charged episode rented through a charged episode viewing right is available anytime for the predetermined time period, to a user account.

This may mean that a use term (or a reading term) of a charged episode is preset.

In the case of reusing the charged episode which has been used through the charged episode viewing right after the predetermined time period by the user account, the controller 130 may perform a payment process to pay electronic money, a coupon, a viewing right, etc.

Under this configuration, in the method and the system for providing contents of the present disclosure, a substantial reading of a charged episode may be performed within a predetermined time.

In the present disclosure, information on the term of use (or a rent term) of a charged episode rented through a charged episode viewing right may be displayed on an item of the corresponding charged episode.

For instance, as shown in FIGS. 4(*g*) and 4(*h*), episode items 426, 427 each corresponding to a charged episode rented through a charged episode viewing right may include time information 426*a*, 427*a*, respectively, on an available time of the corresponding episode through the charged episode viewing right.

For instance, as shown in FIG. 4(*g*), if a remaining use term of a charged episode viewing right is one day, information of "1 day(s) left" (426*a*) may be output on the corresponding item 426. As shown in FIG. 4(*h*), if a remaining use term of a charged episode viewing right is 23 hours and 59 minutes, information of "23:59 left" (427*a*) may be output on the corresponding episode item 427.

The controller 130 may display time information in a different manner, according to a remaining time corresponding to a use term of a charged episode viewing right.

For instance, if the remaining use term of the charged episode viewing right is 24 hours or more, the controller 130 may provide "information on the number of remaining days", as information of the use term of the charged episode viewing right. In this case, as shown in FIG. 4(*g*), information of "1 day(s) left" (426*a*) may be output on the episode item 426 corresponding to an episode for which a charged episode viewing right has been used, as information on the number of remaining days.

In contrast, if the remaining use term of the charged episode viewing right is less than 24 hours, the controller 130 may provide "information on a remaining time", as information of the use term of the charged episode viewing right. In this case, as shown in FIG. 4(h), information of "23:59 left" 427a (23 hours and 59 minutes) may be output on the episode item 427 corresponding to an episode for which a charged episode viewing right has been used, as information on a remaining time.

If the use term of the charged episode viewing right expires, as shown in FIGS. 4(c), 4(d) and 4(e), at least one of information i) information indicating that a charged episode viewing right is available, ii) the sale price of a charged episode, and iii) history information indicating that a charged episode viewing right has been previously used, may be output on an item of a corresponding charged episode. The controller 130 may display proper information according to a current state of a corresponding charged episode (e.g., whether a charged episode viewing right is available or not, etc.).

As aforementioned, in the method and the system for providing contents according to the present disclosure, state information of a corresponding episode may be displayed on each item corresponding to each episode. Thus, a user may intuitively predict a required use condition or a required use right when using a corresponding episode, based only on information included in an episode list.

Figure 5A:
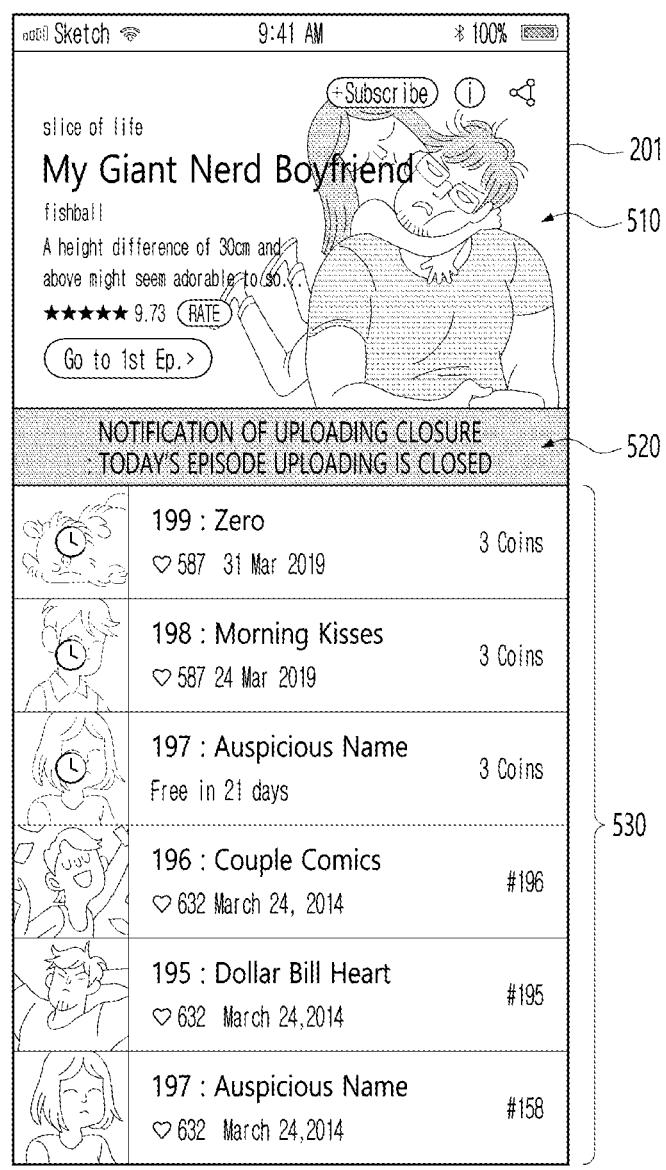
FIGS. 5A and 5B are conceptual diagrams for explaining a method for guiding contents-related information.
Figure 5B:

Hereinafter, a configuration of a contents entering screen (or "screen") including an episode list will be explained with reference to the attached drawings. FIGS. 5A and 5B are conceptual diagrams of contents entering screens 510 and 540, respectively on the electronic device 200 for explaining a method for guiding contents-related information.

In a case in which a selection request for specific contents by a user is received as shown in FIG. 3A, the controller 130 may provide the contents entering screens (or pages) 510, 540 for selecting at least one of a plurality of episodes which constitute the specific contents, as shown in FIGS. 5A and 5B.

As shown in FIGS. 5A and 5B, the contents entering screens (or pages) 510, 540 may include regions including information on corresponding contents (e.g., first regions 520, 550), and regions including episode lists (e.g., second regions 530, 560).

Here, information on specific contents, a specific user account which has logged-in the electronic device, and information on at least one of them may be provided to the first regions 520, 550. In the present disclosure, such first regions 520, 550 may be referred to as "notification regions".

The controller 130 may output guide information related to corresponding specific contents, or guide information on a user account related to corresponding specific contents, to the first regions 520, 550.

For instance, as shown in FIG. 5A, in a case in which episodes of specific contents have not been uploaded yet, the controller 130 may output, to the first region 520, guide information such as "Notification of uploading closure: Today's episode uploading is closed.".

Further, as shown in FIG. 5B, in a case in which a charged episode viewing right retained by a user account is available to an episode included in specific contents, the controller 130 may output information on the charged episode viewing right to the first region 550.

Here, the information on a charged episode viewing right may include at least one of i) information on the number of charged episode viewing rights retained by a user account (or the number of times of availability of charged episode viewing rights), ii) information on an attribute of a charged episode viewing right, and iii) information on a current available state of a charged episode viewing right (e.g., "available" when it is usable).

The information on an attribute of a charged episode viewing right may include at least one of i) information on the remaining number of charged episode viewing rights (or information on the remaining number of times of availability of charged episode viewing rights), and ii) information on the number of charged episode viewing rights at a preset time period (e.g., everyday (24 hours)).

In a case in which a request to view a charged episode is received from the electronic device 200, the controller 130 may determine whether a charged episode viewing right exists for a user account. If a charged episode viewing right exists for the user account, the controller 130 may process the charged episode viewing right retained by the user account for use, and may provide a charged episode to the electronic device.

The controller 130 may subtract the number of times of availability of the charged episode viewing right allocated to the user account, based on the provision of the charged episode. In this case, the controller 130 may update the notification information output to the first region 550, based on the subtraction of the number of times of availability of the charged episode viewing right.

That is, notification information related to a charged episode viewing right retained by a user account may be updated based on subtraction of the number of times of availability of the charged episode viewing right. Information included in the first region 550 for outputting the notification information related to the charged episode viewing right may be updated by interworking with the use of the charged episode viewing right.

The configuration of the first regions 520, 550 and the second regions 530, 560 is merely exemplary, and can be modified in various manners. The first regions 520, 550 may be output to the electronic device 200 in a fixed manner, regardless of scrolling of the list of the second regions 530, 560. That is, the controller 130 may scroll the list included in the second regions 530, 560, without changing an output position of the first regions 520, 550.

In the present disclosure, contents information is provided to a user together with an episode list, through a notification region. This may allow a user to intuitively check various information on contents before using episodes.

In the present disclosure, when a user is to use a charged episode viewing right or is to pay electronic money for a charged episode, information on a time when the corresponding charged episode is converted into a free episode may be provided. This will be explained in more detail with reference to the attached drawings. FIGS. 6A, 6B, 7A, 7B, 8A, 8B, 9A, 9B, 10 and 11 are conceptual illustrations for explaining a method for inducing a user's economic consumption at the time of purchasing charged contents, in the method and the system for providing contents according to the present disclosure.

More specifically, in a case in which a selection request for a charged episode is received from the electronic device 200, the controller 130 may check a time when a product type of the charged episode may be converted into a free product type, before subtracting the number of times of availability of a charged episode viewing right, or before paying electronic money. If the time when the charged product type is converted into a free product type is within a preset time, the controller 130 may provide, to the electronic device 200, notification information (guide information) on the conversion time of the product type of the specific episode.

That is, in the present disclosure, notification information may be provided in order to prevent a user from unnecessarily consuming a charged episode.

Figure 6A:
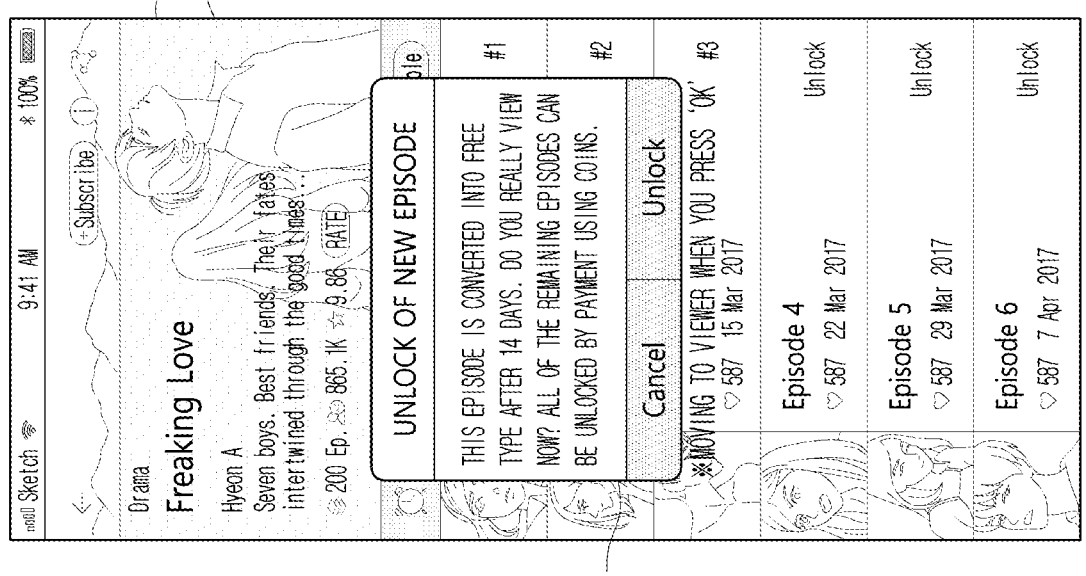

For instance, if a charged episode item 611 for which a 'charged episode viewing right' can be used is selected from the electronic device 200 as shown in FIG. 6A, the controller 130 may output notification information indicating that the charged episode item 611 will be converted into a free product type after a predetermined time (e.g., 14 days), (e.g., "This episode is converted into a free product type after 14 days. Do you really want to read now?") as shown in FIG. 6B.

Further, if a request to view a charged episode is received from a user account (or the electronic device 200) (e.g., an icon of "unlock" is selected on the electronic device), the controller 130 may subtract the number of times of availability of the charged episode viewing right allocated to the user account, and may provide a charged episode.

Figure 6B:
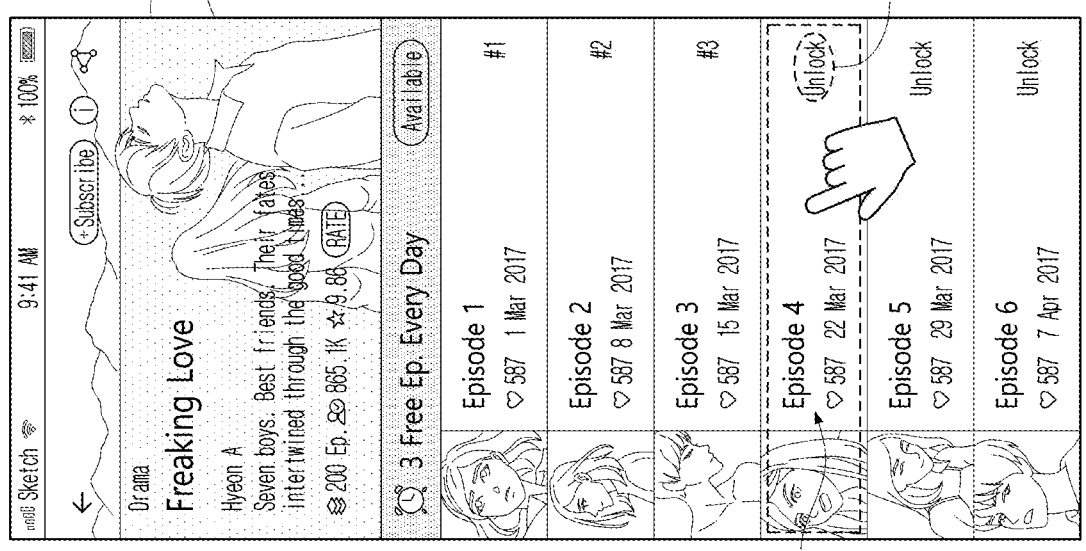

Further, as shown in FIG. 6B, the controller 130 may additionally provide information on a method for viewing the remaining episodes, to notification information 612. For instance, as shown, the controller 130 may additionally provide information indicating that a payment using electronic money is required to use all of the remaining episodes, such as "All of the remaining episodes can be unlocked by payment using coins."

Even in the case of purchasing a charged episode by using electronic money, the controller 130 may provide information on time to convert a charged episode into a free episode, in a similar manner to the aforementioned method.

Figure 7A:
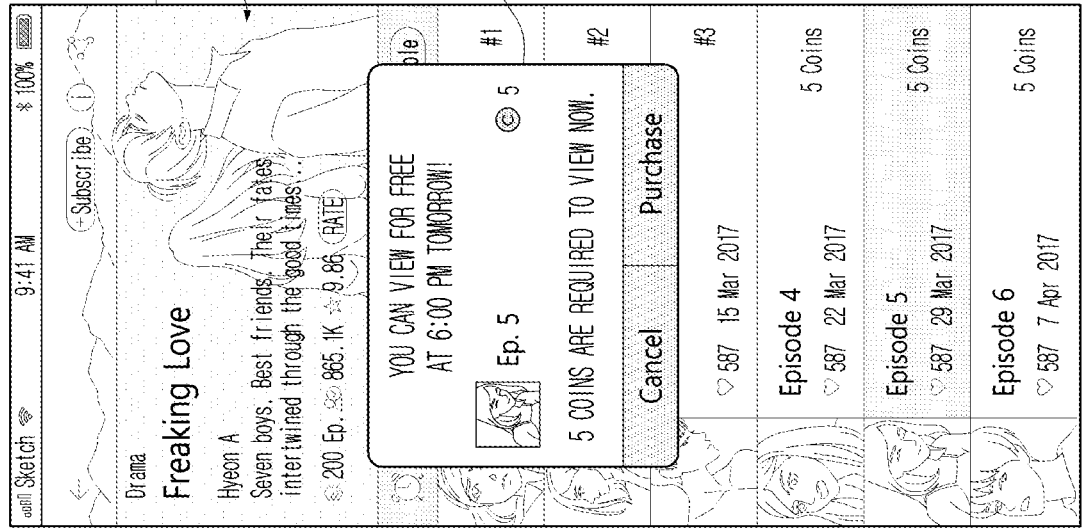
Figure 7B:
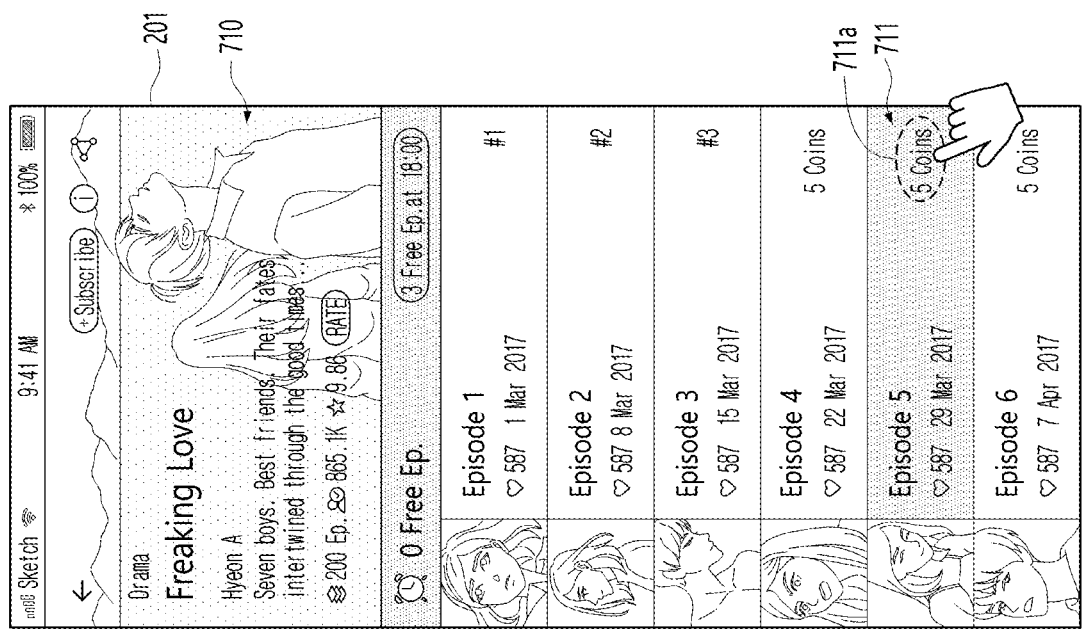

For instance, as shown in FIG. 7A, if a charged episode item 711 requiring a payment of electronic money is selected from the electronic device 200, the controller 130 may output notification information indicating that the charged episode item 711 will be converted into a free product type after a predetermined time (e.g., 6 o'clock pm tomorrow) (e.g., "You can view for free at 6:00 pm tomorrow!") as shown in FIG. 7B.

If a request to view a charged episode is received from a user account (or the electronic device 200) (e.g., an icon of "purchase" is selected on the electronic device), the controller 130 may subtract electronic money retained in the user account, and may provide a charged episode.

That is, the electronic money retained in the user account may be paid for purchase of the charged episode. Although not shown, if the electronic money retained in the user account is not sufficient to pay for purchase of the charged episode, the controller 130 may perform an additional process for charging the electronic money or purchasing electronic money.

Figure 8A:
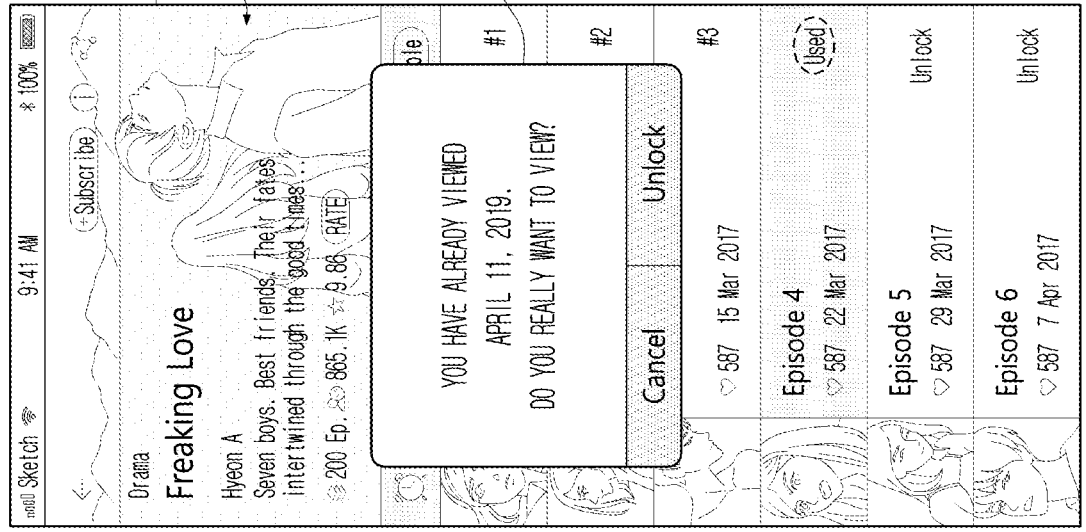
Figure 8B:
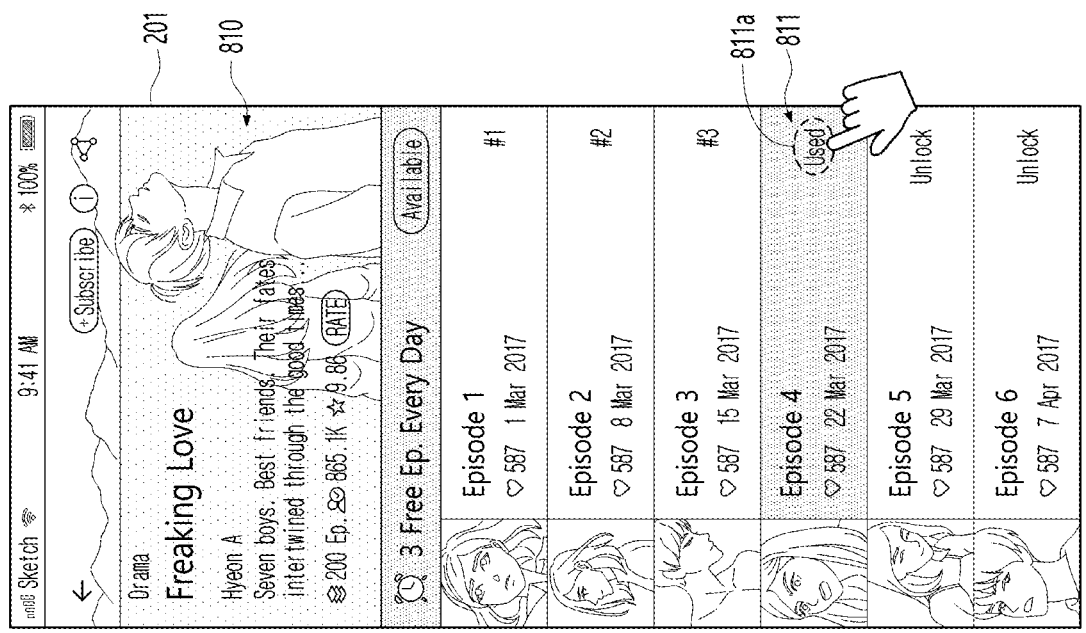

Further, as shown in FIG. 8A, if a request to repurchase or view an episode which has been previously rented through a charged episode viewing right or purchased is received from the user account, the controller 130 may inform a user of a previous purchase or rent through notification information 812, as shown in FIG. 8B.

As shown in FIG. 8A, if an episode item 811 corresponding to an episode which has a history of a previous purchase or rent is selected from the electronic device 200, the controller 130 may provide notification information 812 as shown in FIG. 8B.

The notification information 812 may include information indicating that the episode corresponding to the selected episode item 811 has been previously purchased or rented (e.g., "You've already viewed on Apr. 11, 2019. Do you really want to view?").

Figure 9A:
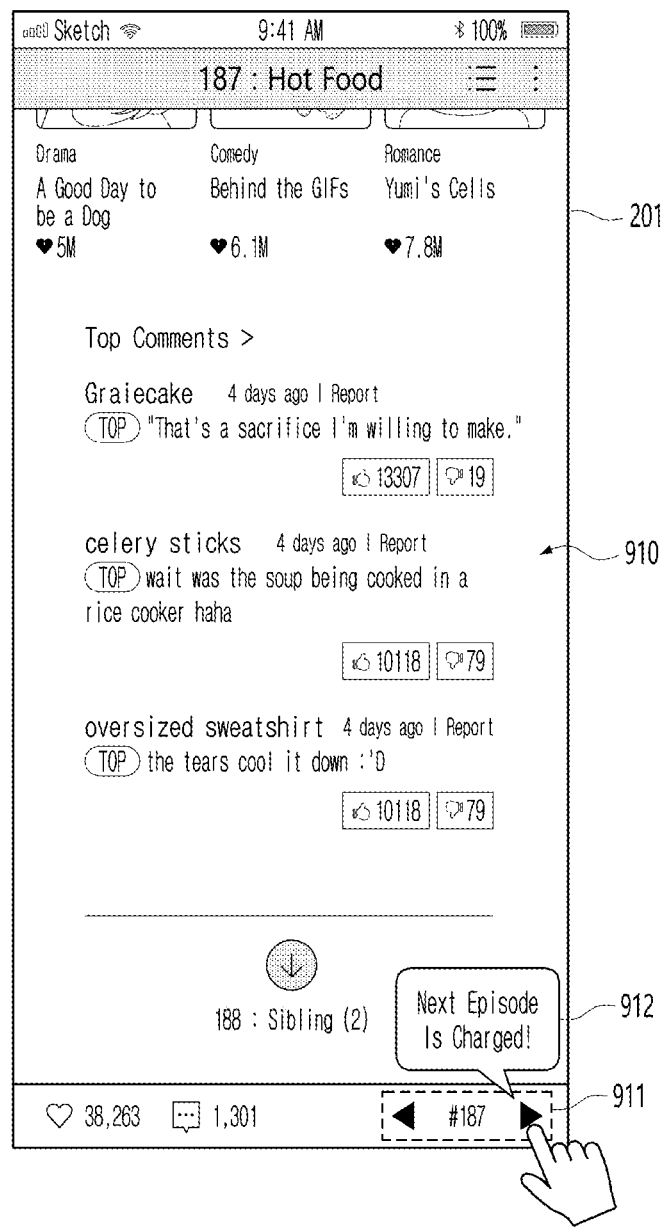

In the present disclosure, as shown in FIG. 9A, based on a user's request in a state that a specific episode 910 has been provided to the electronic device 200, the specific episode of specific contents may be converted into another episode.

As aforementioned, a product type of an episode may be categorized into a free product type and a charged product type. In a case where the next episode 188 (e.g., an episode 188 corresponding to the next episode) different from a current episode 187 (e.g., a current output episode 187) being output to the electronic device 200 is a free product type, the controller 130 may provide the different episode 188 (corresponding to the next episode) to the electronic device, based on a user's request (e.g., an episode conversion request for a function icon 911).

However, in a case where the next episode 188 (e.g., the episode 188 corresponding to the next episode) different from the current episode 187 (e.g., the current output episode 187) being output to the electronic device 200 has a charged product type, the controller 130 may perform an additional process to provide the different episode, based on a user's request (e.g., an episode conversion request for the function icon 911).

In a case in which the episode different from the specific episode has a charged product type, based on a request to view the different episode from the electronic device 200, the controller 130 may determine whether a specific user account which has been logged in through the electronic device 200 has a use right with respect to the different episode. If the specific user account has the use right, the controller 130 may provide the different episode to the electronic device 200. Here, when the user account has electronic money to purchase the different episode, or has a charged episode viewing right, it may mean that the user account has a use right.

As shown in FIG. 9A, the controller 130 may receive a request to convert the current output episode into a different episode, from the electronic device 200, based on a user's selection for the function icon 911. The function icon 911 may be an icon for performing a conversion of a current output episode into an episode uploaded before or after the current output episode. That is, the function icon 911 may be an icon for receiving a conversion request of the current output episode into a different episode.

For instance, in a case in which the different episode has a charged product type, the controller 130 may output a pop-up window 912 to one region of the display screen 201 of the electronic device 200, based on a view request for the different episode (e.g., selection of the function icon 911).

The pop-up window 912 may include a notification message indicating that the different episode has a charged product type.

In a case in which the function icon 911 is selected from the electronic device 200 after the pop-up window 912 is output, the controller 130 may process the selection of the function icon 911, as a request to purchase the different episode (or the charged product type of episode). In this case, based on the selection of the function icon 911, the controller 130 may provide the charged episode after subtracting electronic money kept in the user account, or after subtracting a charged episode viewing right.

Although not shown, if the electronic money retained in the user account is not sufficient to pay for purchase of the charged episode, the controller 130 may perform an additional process for charging the electronic money or purchasing electronic money.

Figure 9B:
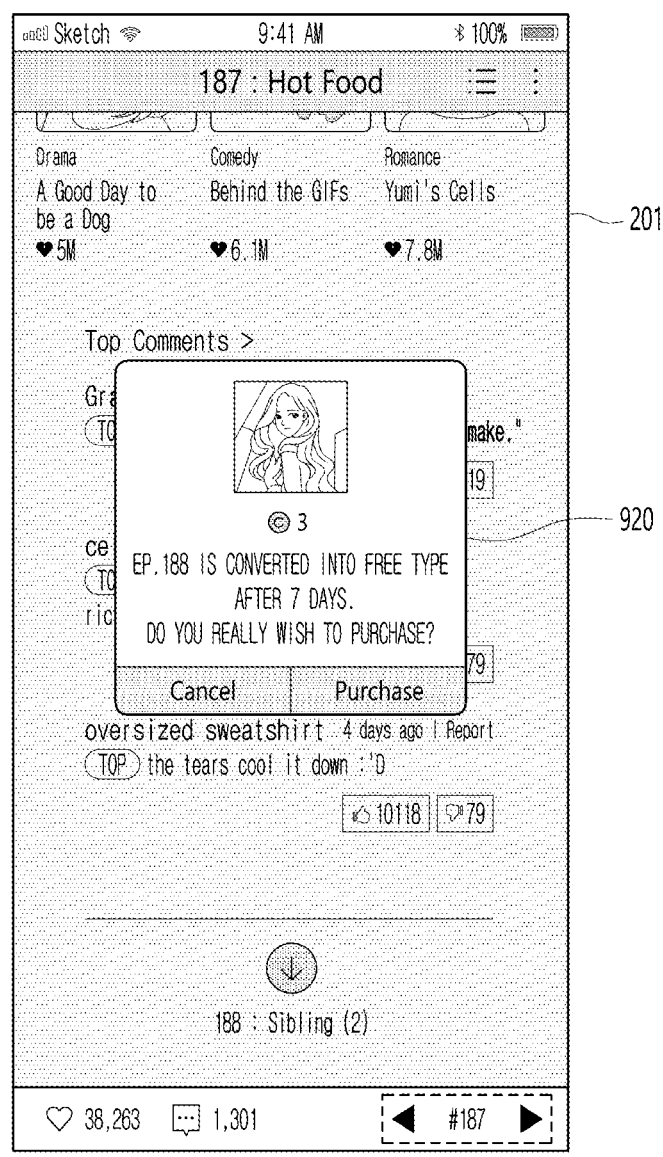

As another example, when a conversion request into the different episode having a charged product type is received from the electronic device 200, the controller 130 may output notification information (e.g., "Ep 188 is converted into a free episode after 7 days.") indicating that the corresponding episode (the different episode) will be converted into a free episode after a predetermined time (e.g., 7 days), as shown in FIG. 9B.

Further, if a request to purchase a charged episode is received from a user account (or the electronic device 200) (e.g., an icon of "purchase" is selected on the display screen 201 of the electronic device 200), the controller 130 may provide the charged episode after subtracting electronic money kept in the user account, or after subtracting a charged episode viewing right. Although not shown, if the electronic money retained in the user account is not sufficient to pay for purchase of the charged episode, the controller 130 may perform an additional process for charging the electronic money or purchasing electronic money.

As aforementioned, in the method and a system for providing contents according to the present disclosure, when a user is to purchase charged contents, information on the time when the charged contents are converted into free contents is provided. This may prevent the user from unnecessarily consuming the charged contents.

In the method and the system for providing contents according to the present disclosure, there may be provided a sale method for allowing a user to purchase a plurality of episodes more cheaply than a single episode, in order to induce purchase of charged episodes. This will be explained in more detail with reference to the attached drawings.

More specifically, the controller 130 may provide a payment process for a sale in a "bundle" by grouping a plurality of charged episodes.

As shown in FIG. 10, on a condition setting screen 1010 on the electronic device 200 for setting sale conditions of contents, various options related to a "bundle" sale may be set, such as i) the number of episodes to be grouped for a sale (e.g., correspondence to a "bundle unit" item), and ii) how much discount will be applied at the time of a bundle sale (e.g., correspondence to a "discount rate" item).

Such options may be selected by a manager, etc., and the controller 130 may set a bundle sale option of contents based on the selection.

Figure 11:
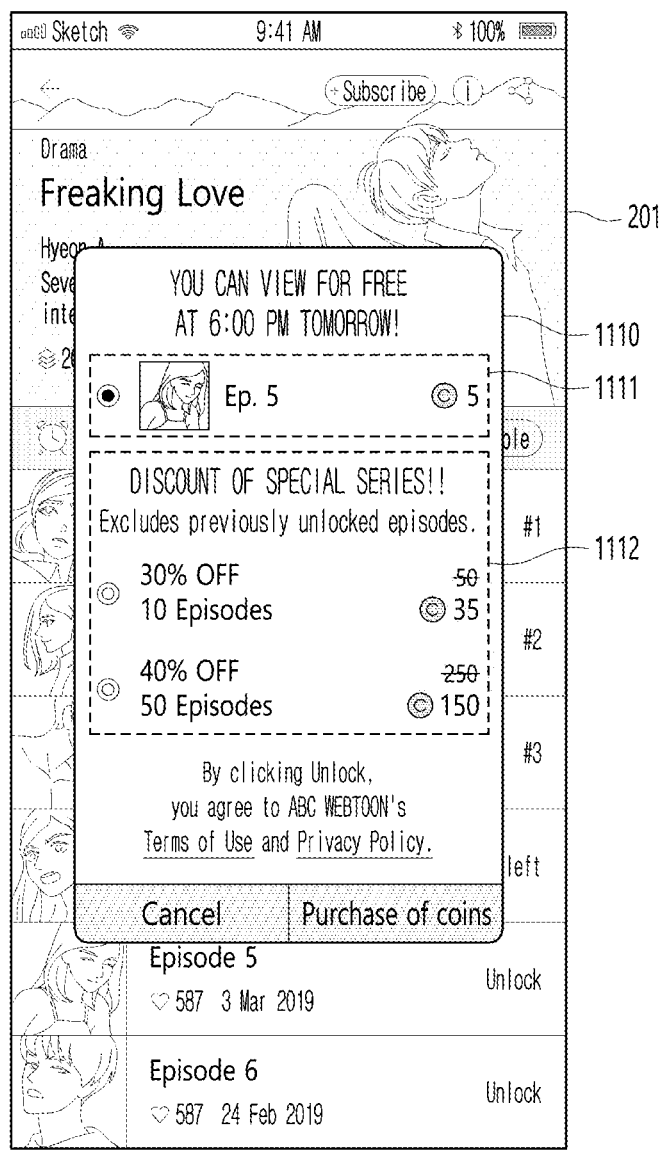

After a bundle sale option to sell episodes in a bundle is set, if a request to purchase contents is received from the electronic device 200, the controller 130 may output sale information 1112 corresponding to a preset sale condition (or a bundle sale condition), as shown in FIG. 11.

As shown, the controller 130 may output each sale option according to the preset bundle sale option. For instance, episode sale information 1110 may include sale price information of each option. For instance, the sale price information may have i) 1 episode is 5 coins, ii) 10 episodes are 35 coins with a discount of 30%, and iii) 50 episodes are 150 coins with a discount of 40%. The controller 130 may output at least one of the number of episodes to be sold in a bundle, price information, and discount rate information, to the sale information. Thus, a user may use contents more economically through a bundle purchase when he or she wishes to continuously purchase the contents.

In a case where one purchase option is selected on the sale information 1110, the controller 130 may provide a payment process to pay the price corresponding to the selected purchase option.

The controller 130 may additionally provide information on a bundle sale option, based on a request to view a single episode.

In the present disclosure, a user may be induced to purchase episodes economically by selecting a bundle sale option with respect to a plurality of episodes.

Although not shown, the present disclosure may provide a condition setting screen (or a page) on the electronic device 200 for setting conditions per contents. On the condition setting screen, various conditions of contents may be set. For instance, on the condition setting screen, various conditions related to contents and a charged episode viewing right may be set, for example, i) a charged sale starting date of contents, ii) a charged sale starting number (or a charged sale starting episode), iii) sale price, iv) whether a charged episode viewing right is available or not, v) a use starting date of a charged episode viewing right, vi) a use ending date of a charged episode viewing right, vii) the number of times of availability (usability) of a charged episode viewing right (or the number of times of availability (usability) of one-day charged episode viewing right, and viii) a providing time of a charged episode viewing right.

Hereinafter, a method for managing a user account in a method and a system for providing contents according to the present disclosure will be explained with reference to the attached drawings. FIGS. 12A, 12B, 13A, 13B, 14A and 14B are conceptual illustrations for explaining a method for managing a user account, in a method and a system for providing contents according to the present disclosure.

As aforementioned, at the time of using an episode having a charged product type (or a charged episode), a user pays electronic money. In this case, the user may purchase electronic money through a preset electronic money purchase process, and may pay the purchased electronic money at the time of viewing an episode.

Figure 12A:
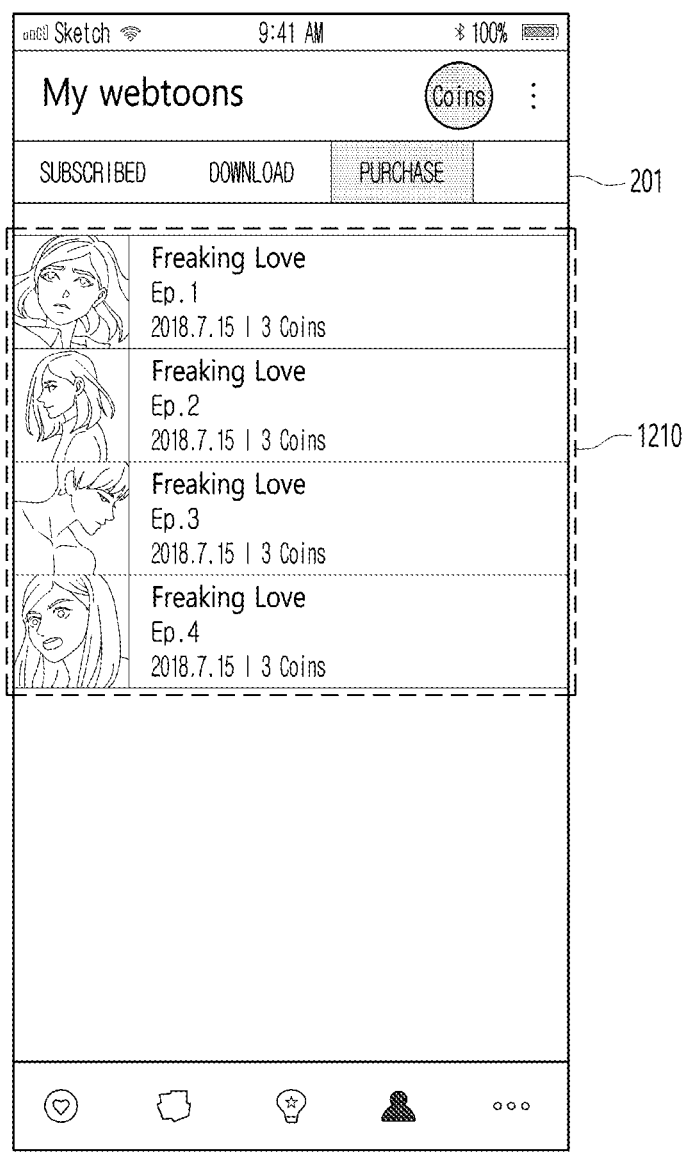
FIGS. 12A, 12B, 13A, 13B, 14A and 14B are conceptual diagrams for explaining a method for managing a user account, in a method and a system for providing contents according to the present disclosure.

Here, the controller 130 may retain user history information related to the use of the electronic money, in the user account, as shown in FIG. 12A.

As the user history information, the controller 130 may store at least one of an episode purchased through the user account, information on coins paid to purchase the corresponding episode, and information on the purchase date. In a case in which a request to view an episode purchase history is received from the electronic device 200 logged in the user account, the controller 130 may provide user history information 1210 to the electronic device, as shown in FIG. 12A.

Figure 12B:
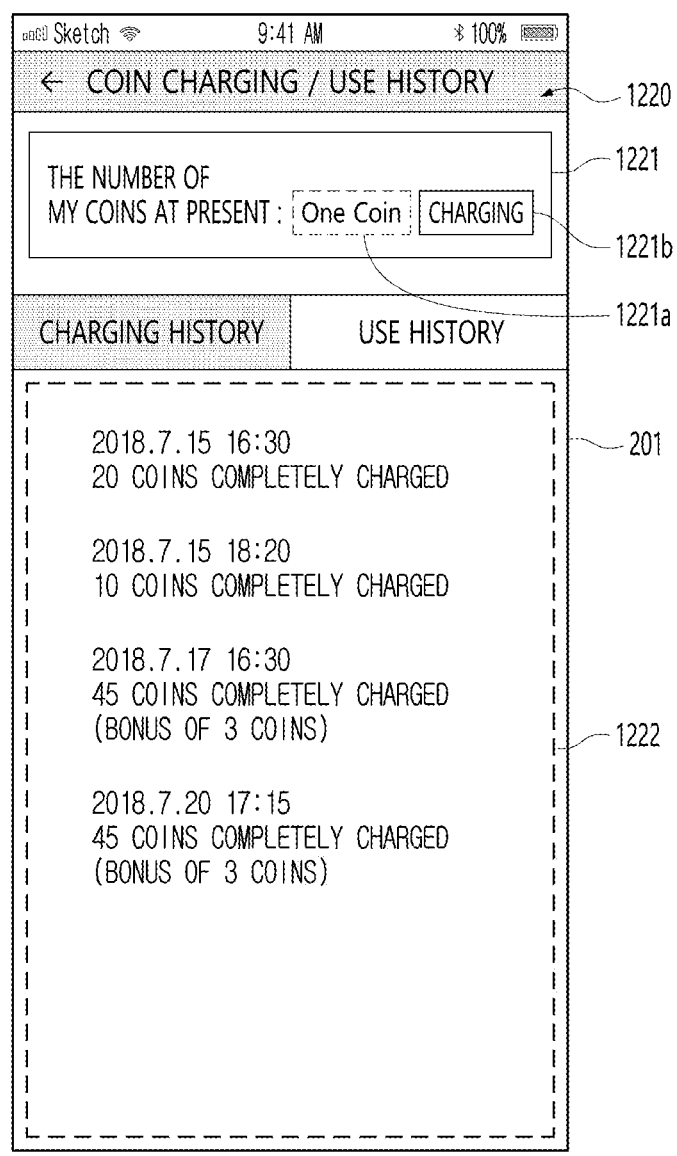

Further, as shown in FIG. 12B, the controller 130 may manage electronic money retention status information 1221 of a user account, as the user history information. As shown, the controller 130 may provide electronic money information 1221a on electronic money retained in the user account (e.g., one coin), to the electronic device 200, based on a request from the electronic device logged in the user account. The controller 130 may provide an electronic money purchase function icon 1221b to the electronic device, thereby allowing electronic money to be purchased by the user account. Further, as shown in FIG. 12B, the controller 130 may provide history information 1222 of purchased electronic money, to the electronic device 200 logged in the user account.

In the present disclosure, a logged-in state of a user account, which can access the contents providing system 100, through the electronic device 200 may be maintained.

That is, if a user account is logged in the contents providing system 100 through a specific electronic device 200, the controller 130 may maintain the logged-in state of the user account through the specific electronic device, even though an output of a page (or a web page or an application page) to the contents providing system 100 is terminated (or an execution of an application is terminated).

Figure 13A:
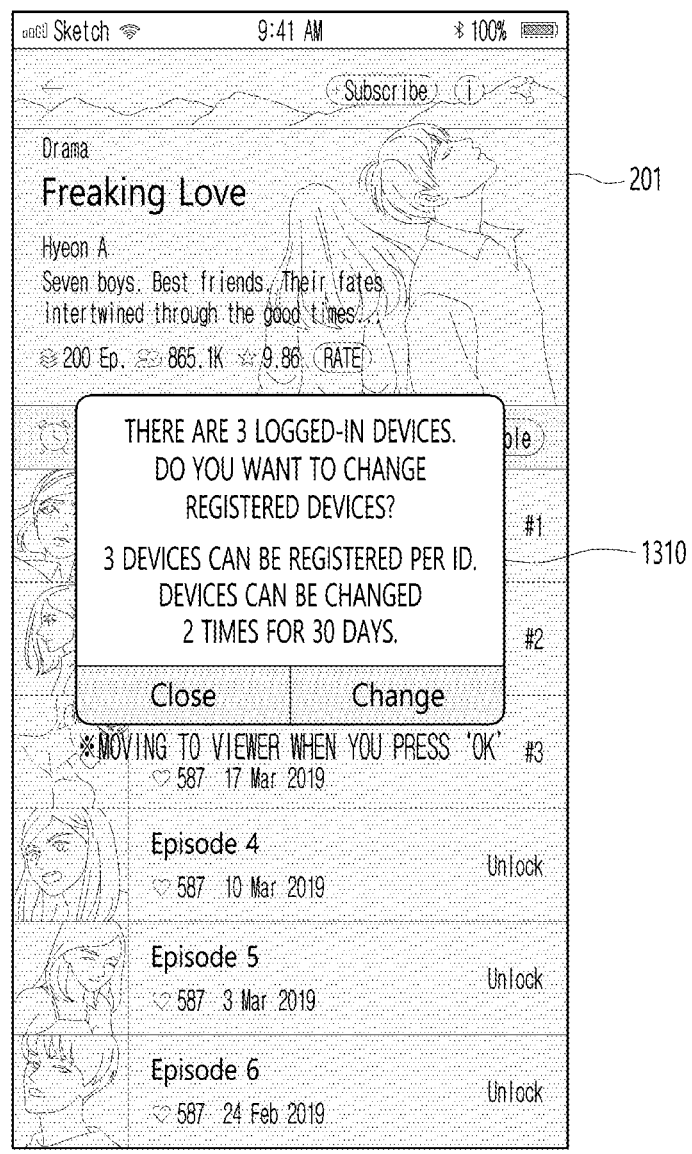
Figure 13B:
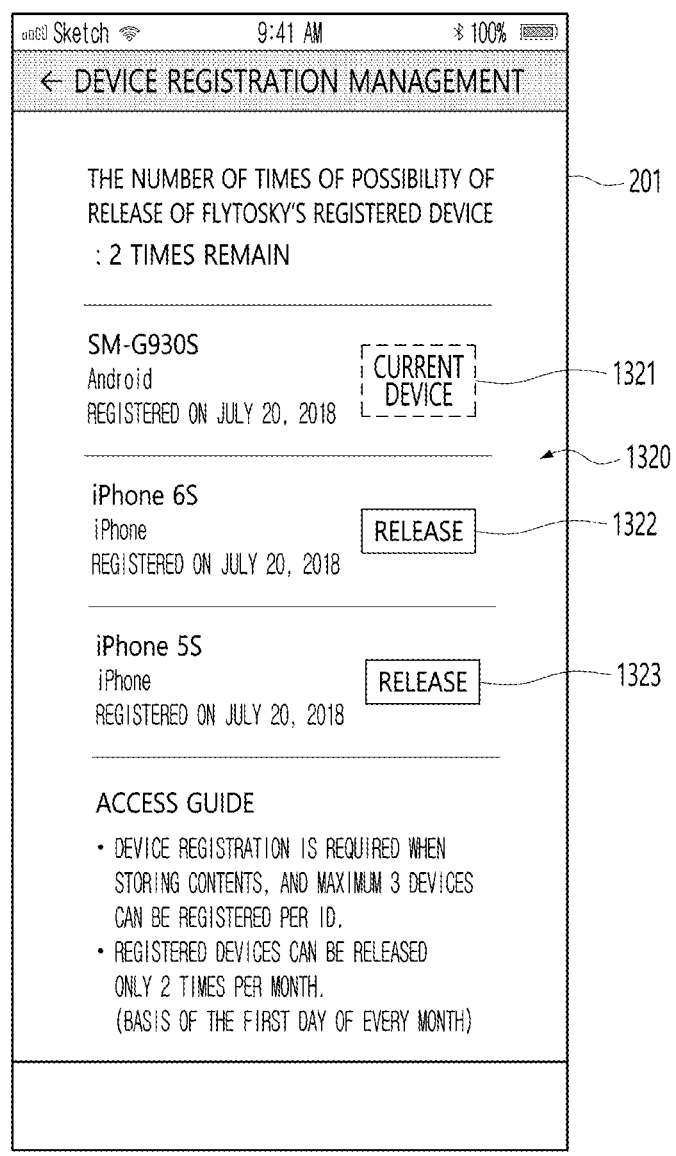

Here, the specific electronic device 200 having its logged-in state maintained may be registered based on a user's selection on a page which manages a user account, as shown in FIG. 13B.

In the present disclosure, the number of electronic devices 200 which can maintain a logged-in state to one user account may be restricted. That is, the controller 130 may allow a single user account to be logged-in through a predetermined number of electronic devices 200. In the present disclosure, as shown in FIG. 13A, the number of times of change (or the number of times of release) of a device which can maintain a logged-in state for a predetermined time may be restricted.

For instance, the controller 130 may change a type of the electronic device 200 to maintain a logged-in state, under a condition of a predetermined number of times (e.g., 2 times) for a preset time period (e.g., 30 days). In this case, as shown in FIG. 13B, the controller 130 may change or release only registered electronic devices (SM-G930S, iPhone 6S, iPhone 5S) for a preset number of times. For instance, a user can release only the electronic devices of iPhone 6S and iPhone 5S, among the registered electronic devices (SM-G930S, iPhone 6S, iPhone 5S).

In the contents providing system 100 according to the present disclosure, in a case where a specific user account is an account having a restricted contents use, provision of contents to the specific user account may be limited. Here, the account having a restricted contents use may be specified by a manager of the contents providing system 100. The controller 130 may determine a use right of the specific user account, by using user account information (e.g., black list information) retained at the storage unit 120 and corresponding to a restricted contents use.

Figure 14A:
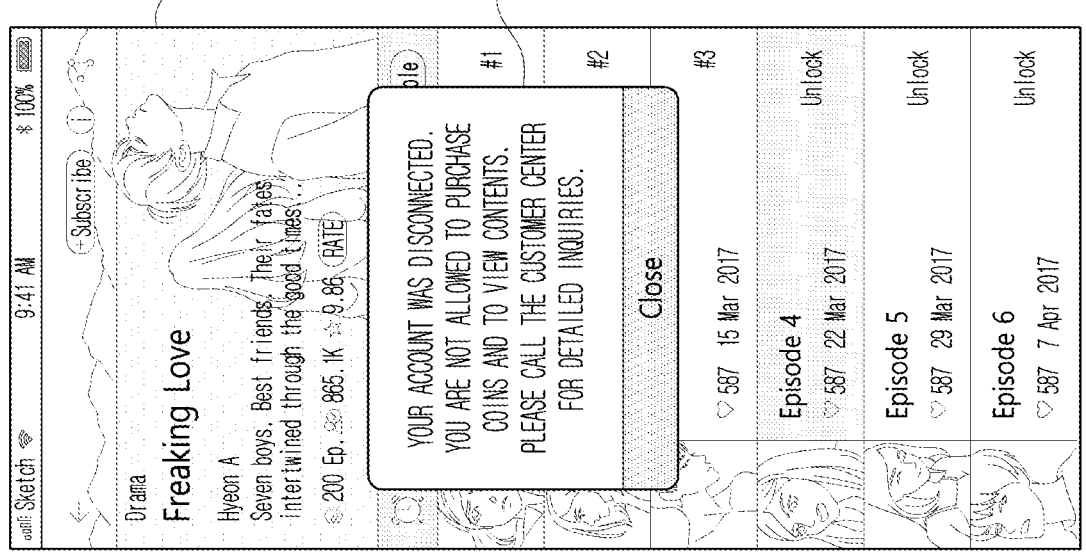

As shown in FIG. 14A, when one episode item 1410 is selected from a plurality of episode items included in the episode list through the display screen 201 of the electronic device 200, the controller 130 may determine whether a specific user account, which has been logged in through the electronic device 200, has a use right with respect to the specific episode.

In a case in which the specific episode is an episode of a charged product type, the determination about a use right may include a process of determining whether the specific user account i) has electronic money to purchase the charged episode, or ii) has a charged episode viewing right.

Further, the determination about a use right may include a process of checking i) whether the specific user account is a user account having a restricted contents use. Such a checking process may be performed equally regardless of whether an episode requested to be viewed has a charged product type or a free product type.

Figure 14B:
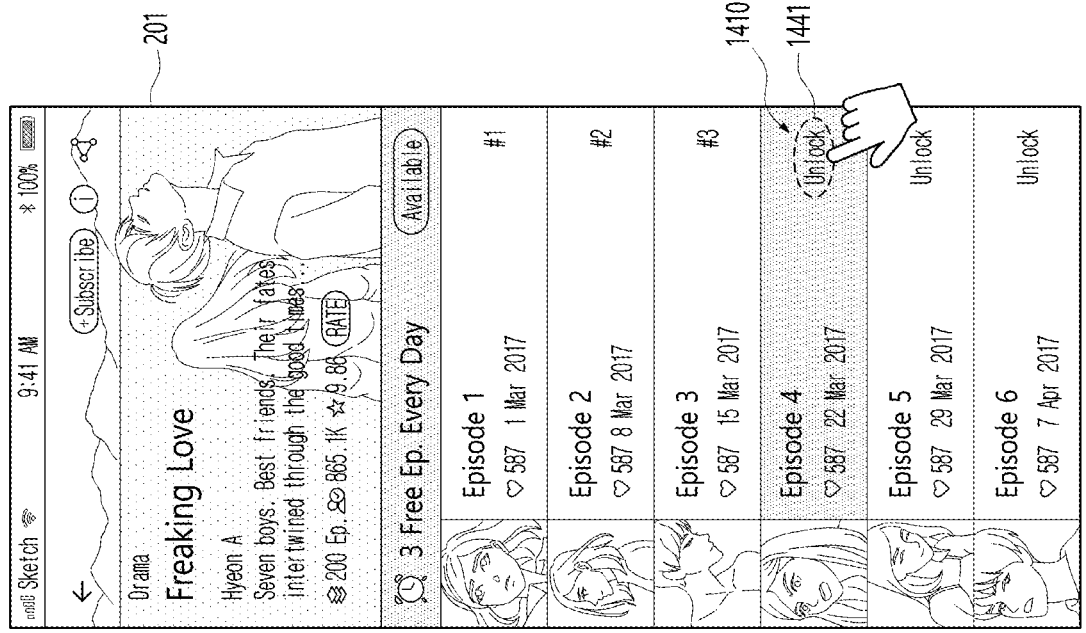

If the specific user account is a user account having a restricted contents use as a result of the checking, the controller 130 may restrict a provision of the specific episode to the electronic device 200 logged in the specific user account, even if the specific user account has a use right with respect to the specific episode. In this case, notification information 1442 indicating that viewing of contents (or episodes) is restricted may be output to the user's electronic device 200 as shown in FIG. 14B.

Figure 15:
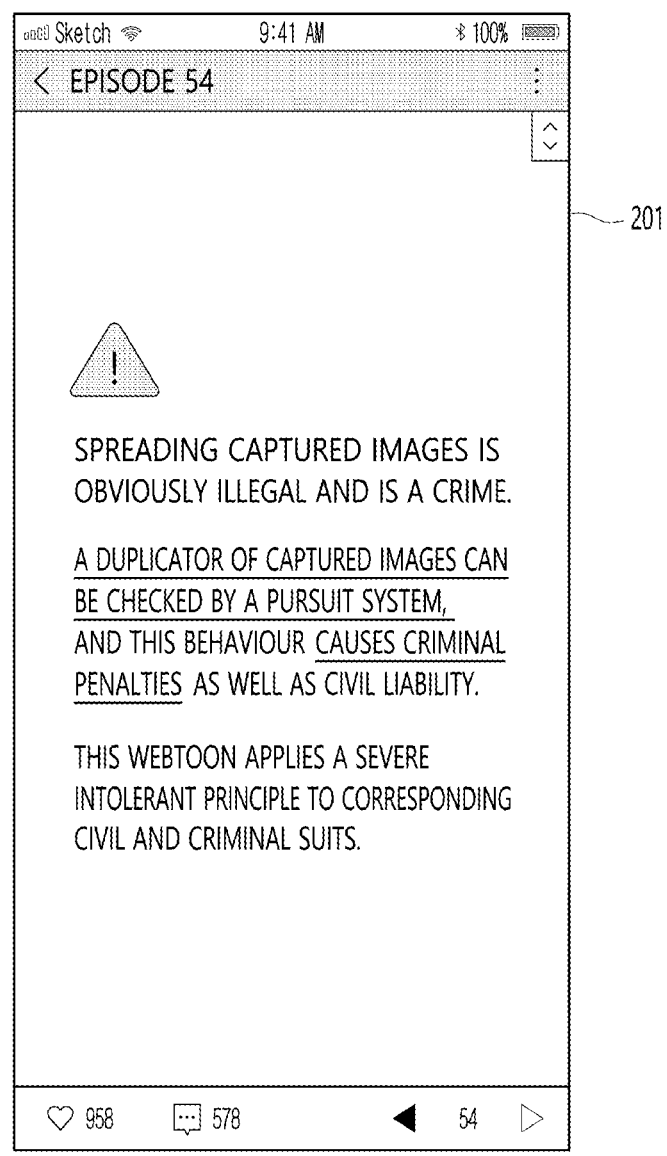
FIG. 15 is a conceptual diagram for explaining a method for protecting contents, in a method and a system for providing contents according to the present disclosure.

In the present disclosure, the electronic device 200 may be monitored for protection of contents. This will be explained in more detail with reference to the attached drawing. FIG. 15 is a conceptual illustration for explaining a method for protecting contents, in a method and a system for providing contents according to the present disclosure.

As shown in FIG. 15, in a case where an event to capture (or copy) contents occurs on the electronic device 200, the controller 130 of the present disclosure may output guide information on the display screen 201 of the electronic device 200 indicating that the capture event has been detected. Based on the detection of the capture event, the controller 130 may terminate the output of the contents which were being provided to the electronic device 200, and may output the guide information.

While the contents are being provided to the electronic device 200, the controller 130 may monitor a signal generated from the electronic device. Here, the signal to be monitored may be a key input or a touch input for generating a capture command from the electronic device 200.

The monitoring of a signal generated from the electronic device 200 may be performed by a preset security algorithm provided through the contents providing system 100 according to the present disclosure.

The controller 130 may prevent a contents capturing on the electronic device 200 through such a monitoring. As aforementioned, in the contents providing system 100 according to the present disclosure, infringement of a copy right of contents due to capturing on the electronic device may be prevented.

As aforementioned, in the method and the system for providing contents according to the present disclosure, an alignment method of contents may be differently configured according to an attribute of the contents. This may allow a user to intuitively check an attribute of corresponding contents only based on an alignment method of the contents.

More specifically, in the method and the system for providing contents according to the present disclosure, an alignment method of an episode list of episodes which constitute contents may be differently provided according to contents which have been completely uploaded and contents which are being uploaded. Thus, a user may intuitively check an uploaded state of corresponding contents, only based on an alignment method of an episode list.

In the present disclosure, in the case of contents which have been completely uploaded, an episode list is aligned in a time order. This may induce a user to sequentially use episodes from a first episode. Further, in the present disclosure, in the case of contents which are being uploaded, an episode list is aligned in a reverse time order. This may enhance user's convenience in immediately using contents which have been updated most recently.

Further, in the present disclosure, information on a use right with respect to a corresponding episode may be provided to each episode item included in the episode list. Thus, a user may intuitively check whether a corresponding episode is available or not, through information on each episode item.

The configurations and methods of the electronic device in the aforesaid embodiments may not be limitedly applied, but such embodiments may be configured by a selective combination of all or part of the embodiments so as to implement many variations.

The present disclosure can be implemented as computer-readable codes in a computer-readable recording medium. The computer-readable recording medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable recording medium may also be implemented as a format of carrier wave (e.g., transmission via an Internet). The computer may include the controller 130 of the terminal.

It should be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method for providing contents from a contents server, comprising:
receiving, by a processor, a selection request for specific contents, from an electronic device; and
providing, to the electronic device by the processor, an episode list of a plurality of episodes which constitute the specific contents, based on the selection request for the specific contents,
wherein the episode list provided to the electronic device is aligned in a first predetermined manner on the electronic device when the specific contents are a first contents type in which the plurality of episodes of the specific contents is completely uploaded in the contents server, and in a second predetermined manner, different from the first predetermined manner on the electronic device when the specific contents are a second contents type in which the plurality of episodes of the specific contents is partially uploaded to the contents server.

2. The method of claim 1, wherein, in the first manner, the episode list is aligned in a time order, based on an uploaded time of the plurality of episodes.

3. The method of claim 2, wherein in a case in which there exists a specific episode which has been viewed by a specific user account which has been logged in through the electronic device, among the plurality of episodes, a specific episode item corresponding to the specific episode is arranged as a first item of the episode list.

4. The method of claim 1 wherein, in the second predetermined manner, the episode list is aligned in a reverse time order, based on an uploaded time of the plurality of episodes.

5. The method of claim 4, wherein in a case in which the episode list is aligned in the reverse time order, a function icon to access a specific episode among the plurality of episodes is provided on one region of a display screen of the electronic device, and
wherein the specific episode is a firstly-uploaded episode among the plurality of episodes.

6. The method of claim 1, wherein a case in which the specific contents are the second contents type, the specific contents are converted into the first contents type from the second contents type when the plurality of episodes is completely uploaded in the contents server.

7. The method of claim 6, wherein in a case in which at least one of the plurality of episodes is purchased in a state where the specific contents are the second contents type, the purchased episode can be viewed for free, even if the specific contents are converted into the first contents type from the second contents type.

8. The method of claim 1, wherein the episode list includes a plurality of episode items corresponding to the plurality of episodes, and
wherein each of the plurality of episode items includes state information of a corresponding episode.

9. The method of claim 1, further comprising:
selecting one episode item among a plurality of episode items included in the episode list, through the electronic device;

determining, by the processor, whether a specific user account which has been logged in through the electronic device has a use right with respect to the specific episode, based on the selection of the one episode item; and
in a case in which the specific user account has a use right with respect to the specific episode as a result of the determination, providing, by the processor, the specific episode to the electronic device.

10. The method of claim 9, wherein the determining of the use right of the specific user includes checking whether the specific user account is a user account having a restricted contents use, and
wherein in a case in which the specific user account is a user account having the restricted contents use as a result of the checking, a provision of the specific episode to the electronic device used to log in the specific user account is restricted, even if the specific user account has a use right with respect to the specific episode.

11. The method of claim 9, further comprising:
in a case in which a request to view an episode different from the specific episode is received from the electronic device, in a state that the specific episode has been output to the electronic device, determining whether the specific user account has a use right with respect to the different episode,
wherein the request to view the different episode is performed based on a selection of a function icon which is output together with the specific episode, on a display screen on the electronic device.

12. The method of claim 11, wherein in a case in which the different episode has a charged product type which requires a payment of electronic money for viewing, guide information related to a time when the charged product type of the different episode is converted into a free product type is provided to the electronic device, based on a selection of the function icon for requesting to view the different episode.

13. The method of claim 1, wherein in the providing of the episode list, the specific contents, a specific user account which has been logged in through the electronic device, and information related to at least one of the specific contents and the specific user account are provided on one region of a display screen on the electronic device, the one region being different from a region where the episode list has been provided.

14. The method of claim 13, wherein in a case in which an episode which can be viewed by a use right allocated to the specific use right is included in the plurality of episodes, guide information indicating that the use right is available to the specific contents is included in the different one region.

15. The method of claim 14, wherein a graphic object indicating that the use right is available is included in one region of an episode item corresponding to the episode which can be viewed by the use right, among the episode list.

16. A system for providing contents from a contents server, comprising:
a communication unit configured to receive a selection request for specific contents, from an electronic device;
a storage unit configured to store a plurality of episodes included in the specific contents; and
a controller configured to control the communication unit such that a plurality of items corresponding to the plurality of episodes, respectively, are provided to the electronic device, in response to the selection request, wherein an episode list provided to the electronic device is aligned on the electronic device in a first predetermined manner when the specific contents are a first contents type in which the plurality of episodes of the specific contents is completely uploaded in the contents server, and in a second predetermined manner, different from the first predetermined manner, when the specific contents are a second contents type in which the plurality of episodes of the specific contents is partially uploaded to the contents server.

17. A non-transitory computer-readable recording medium storing a program for providing contents, the program causing at least one processor,- to perform the steps comprising:

receiving a selection request for specific contents, from an electronic device; and providing, to the electronic device, an episode list of a plurality of episodes which constitute the specific contents, based on the selection request for the specific contents, wherein the episode list provided to the electronic device is aligned in a first predetermined manner on the electronic device when the specific contents are a first contents type in which the plurality of episodes of the specific contents is completely uploaded in the contents server, and in a second predetermined manner, different from the first predetermined manner, on the electronic device when the specific contents are a second content type in which the plurality of episodes of the specific content is partially uploaded to the contents server.

* * * * *